US012741200B2

(12) United States Patent
Phillips et al.

(10) Patent No.: US 12,741,200 B2
(45) Date of Patent: Sep. 22, 2026

(54) METHODS AND SYSTEMS FOR CLOUD GAMING

(71) Applicant: Adeia Guides Inc., San Jose, CA (US)

(72) Inventors: Christopher Phillips, Hartwell, GA (US); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 903 days.

(21) Appl. No.: 17/866,142

(22) Filed: Jul. 15, 2022

(65) Prior Publication Data

US 2024/0017167 A1 Jan. 18, 2024

(51) Int. Cl.
*A63F 13/355* (2014.01)

(52) U.S. Cl.
CPC .................................. *A63F 13/355* (2014.09)

(58) Field of Classification Search
CPC ........ A63F 13/355; A63F 13/35; A63F 13/31; A63F 13/30; A63F 13/352; A63F 13/77
See application file for complete search history.

(56) References Cited

U.S. PATENT DOCUMENTS 10,207,184 B1 * 2/2019 Leung ................. H04L 65/1063
10,960,315 B1 * 3/2021 Hunter .................. A63F 13/795
12,273,274 B2 4/2025 Thyagaturu et al.
2004/0230444 A1 * 11/2004 Holt .................... G07F 17/3223 370/329
2013/0244784 A1 * 9/2013 Assa ..................... G06F 3/0416 463/40
2014/0128021 A1 * 5/2014 Walker ................ H04W 68/005 455/405
2014/0258446 A1 9/2014 Bursell
2014/0280604 A1 * 9/2014 Ahiska .................... H04L 67/10 709/205
2015/0012661 A1 * 1/2015 Elmore .............. H04N 21/2393 709/231
2015/0057078 A1 * 2/2015 Moore .................... A63F 13/35 463/31
2015/0263908 A1 9/2015 Gordon et al.
2015/0265927 A1 * 9/2015 Taylor ..................... A63F 13/69 463/9
2015/0372878 A1 12/2015 Ganesan et al.
2017/0312626 A1 * 11/2017 Colenbrander ......... A63F 13/35
2018/0241617 A1 * 8/2018 Radzikowski ...... H04L 41/0895
2018/0287891 A1 * 10/2018 Shaw .................... H04W 24/02
2019/0321732 A1 * 10/2019 Zimring ................ A63F 13/235
2021/0060425 A1 * 3/2021 Thomas .................. A63F 13/34
(Continued)

OTHER PUBLICATIONS

U.S. Appl. No. 17/866,146, filed Jul. 15, 2022, Christopher Phillips.

*Primary Examiner* — Ankit B Doshi
(74) *Attorney, Agent, or Firm* — HG LAW LLP

(57) ABSTRACT

Systems and methods for establishing a session of gameplay in a cloud computing system. The methods and system comprising receiving a request to establish a session of gameplay on a user device, retrieving a user profile associated with a user of the user device. The user profile identifies a service level agreement for the session of gameplay, from which the session of gameplay is established. The service level agreement is evaluated to determine a first list of available upgrades to the session of gameplay, and a user interface is provided to the user, wherein the user interface allows selection of the determined available upgrades.

20 Claims, 14 Drawing Sheets

(56) References Cited

U.S. PATENT DOCUMENTS

| | | | | |
|---|---|---|---|---|
| 2021/0144202 | A1* | 5/2021 | Maciocco | H04L 67/1051 |
| 2021/0392142 | A1* | 12/2021 | Stephens | H04L 63/104 |
| 2022/0023755 | A1* | 1/2022 | Vukojevic | A63F 13/352 |
| 2022/0092926 | A1* | 3/2022 | Palmisano | G07F 17/3267 |
| 2023/0069598 | A1* | 3/2023 | Hutchison | G06F 11/302 |
| 2024/0017168 | A1 | 1/2024 | Phillips et al. | |

* cited by examiner

METHODS AND SYSTEMS FOR CLOUD GAMING

FIELD OF INVENTION

The present disclosure relates to methods and systems for provisioning cloud gaming services and, more particularly, to systems and related processes for in-game upgrades to improve quality of service or quality of experience for a requested session of gameplay.

BACKGROUND

Online purchases of games with the ability to download, install, and run the game locally have been around for some time. Now companies are starting to offer services for users to subscribe to and play a game that runs on the network. This service is called cloud gaming and can be defined as a gaming service that is not rendered locally to the end-user (i.e., "the gamer"). Cloud gaming is gaining traction among game studios, internet companies and network operators. There are currently products on the market like Google's Stadia, Nvidia's GeForce Now and Sony's PS Now (all registered trademarks, RTMs) which offer remote game streaming as a business. Amazon® and other hyper-cloud providers and big tech companies are also entering into the business of cloud gaming. Today cloud-based/remote rendered games run somewhere in a hyper-cloud provider's network and the game streams are transported over an unmanaged network to the client device. Network operators are exploring ways to partner with game companies and hyper cloud providers to offer network edge compute resources and managed network services specifically for cloud gaming. Leveraging much better control of network resources with minimal packet loss, jitter, and feedback from the managed network to the encoders and cloud gaming platform provides better control of the game quality of experience (QoE).

Moreover, when game studios create games that run locally on computer hardware, they define minimum hardware requirements for the video game to be playable or functional. As video games become more complex, the minimum requirements continue to increase for GPU, CPU and memory resources and require end-users to upgrade their hardware to meet these new minimums. Therefore, cloud gaming is on the rise and users don't have to provide the up-front high costs for hardware improvements, and can subscribe to better hardware in the cloud, using their personal machine as a terminal/portal to access the cloud virtual machine.

SUMMARY

Accordingly, this invention introduces in-game upgrades at a granular layer for the in-game experience. These upgrades can be specifically for a level in a game, for a multiplayer party, tied to a specific game title, or when a major battle is going to take place. The upgrades can be for a time duration, for a number of sessions, or game studio-defined in-game upgrade points. Such upgrades are aimed at improving the Quality of Service (QoS) or QoE the user has, but at a granular level, e.g., more computer processing units, higher bandwidth, higher bitrate, or the like. Packages may be simplified for the end-user, such as "higher FPS", "better graphics", or the like, wherein the packages have preset configurations for the cloud gaming system. These upgrades can also be operator offered for a period or for a level as a free upgrade to promote the enhanced experience for future upsells to the user. Promotional offers, advertisements, studio generated, sales, loot boxes or the like can be used to provide credits to users, which can be used to gain upgrades for QoS or QoE improves for a specific time period, single gaming session, multiplayer party, or level. These upgrades can be automatic or controlled by the user.

In view of the foregoing, the present disclosure provides systems and related methods that provide the provisioning cloud gaming services and, more particularly, systems and related processes for in-game upgrades to improve quality of service or quality of experience for a requested session of gameplay.

In a first approach, there is provided a method for establishing a session of gameplay in a cloud computing system. The method comprises receiving a request to establish a session of gameplay on a user device. For example, the user may select a video game to play that is hosted on a cloud computing server. The method further comprises retrieving a user profile associated with a user of the user device, wherein the user profile identifies a service level agreement for the session of gameplay. The service level agreement is representative of the content the user can access and the level of service the user has for all content, or per content item. The method further comprises establishing the session of gameplay based on the identified service level agreement and evaluating the service level agreement to determine a first list of available upgrades to the session of gameplay. For example, the user may have a service level agreement that enables the user to play a particular video game at the minimum recommended hardware, however, the cloud computing system has additional compute resources (e.g., cores, threads, memory, graphics compute units, and the like) available, which the user can upgrade to use for the requested session of gameplay. Accordingly, the method comprises providing a user interface to the user, wherein the user interface allows the selection of the determined available upgrades.

In some examples, the evaluation of the service level agreement is carried out in parallel to the session of gameplay. For example, upgrades may become available during the session of gameplay, or upgrades may be recommended for a particular level or while in multiplayer mode, and the user can be notified that upgrades are available during a session of gameplay. In other words, the evaluation of the service level agreement, and the determination of available upgrades, can be carried out before, during, or after the provisioning of gameplay to the user device.

In some examples, the method further comprises receiving a user selection of at least one available upgrade to the user and updating the service level agreement on the user profile to comprise at least one selected available upgrade. After user selection of an upgrade, which improves the user's QoS or QoE, the service level agreement is updated to reflect the selection by the user. The method further comprises re-establishing the session of gameplay based on the updated service level agreement, or, continuing the session of gameplay with the selected upgrade. In some examples, the updated service level agreement applies to a second user profile during the establishing session of gameplay. In some examples, the updated service level agreement applies to a second user profile during the establishing session of gameplay. For example, the user may select a higher frame rate, bandwidth, or the like for a competitive multiplayer session, which also applies to the user's teammates.

In some examples, reestablishing the session of gameplay comprises capturing game state data of the gameplay, and storing the captured game state data; wherein the game state data is used to resume gameplay from the point where the user selected at least one available upgrade with the updated service level agreement.

In some examples, at least one available upgrade comprises an expiration. For example, the upgrade may only be available for a period of time, a level within the video game, during competitive gameplay, while playing with a certain teammate, or directed by the game developers (e.g., the developers force an upgrade for a part of the video game that the user is currently in during their gameplay). After expiration, the service level agreement is updated to remove at least one selected available upgrade. The removal of the upgrade may return the user to the previous service level agreement or an intermediate service level agreement between the previous service level agreement and the upgrade service level agreement.

In some examples, the method further comprises evaluating device attributes of the user device; and determining, based on the evaluation of the service level agreement and device attributes, a second list of available upgrades to the session of gameplay. In some examples, the second list of available upgrades is a subset of the first list of available upgrades. For example, there may be upgrades available that the user device is not compatible with, such as higher frame rate or higher resolution; therefore, those upgrades can be removed from the first list of available upgrades to create a second list of available upgrades.

In some examples, the method further comprises retrieving a list of stored value items corresponding to the selected available upgrade. For example, the available upgrade may have an associated cost, whether that be monetary or a redeemable token. The method further comprises receiving an authorization generated as a result of a transaction by the user at a point of purchase. For example, the user may have pre-purchased tokens that can be redeemed for the available upgrade, or, may have purchased the upgrades prior to the request to establish the session of gameplay or on a separate system. Accordingly, the method further comprises determining one or more stored value items to apply to a transaction, based on the authorization, wherein each stored value item includes an associated value, and transmitting a transaction indication message to the user. For clarity, in some examples, the transaction by the user at a point of purchase was carried out before the request for establishing a session of gameplay. In some examples, the associated value is expressed as a currency amount.

In some examples, a stored value item is a coupon for use in transactions with a specified merchant, for a specified video game, a portion of a specified video game, or for a specified time. In some examples, the coupon is obtained after the consumption of a media item by the user. For example, the user may be presented with an option to watch an advertisement for a reward, such as an upgrade, a coupon to be deemed for an upgrade, or a token(s) which can be accrued to redeem an upgrade.

In some examples, establishing the session of gameplay comprises establishing, over a network, a peer-to-peer connection between a streaming server and the user device, and transmitting, over the peer-to-peer connection from the streaming server to the client device, gameplay video and audio generated from the session of gameplay. In some examples, the peer-to-peer connection is a real-time protocol connection, such as web real-time communication (WebRTC) or the like.

In some examples, the gameplay video is encoded in a compressed format based on the service level agreement. In some examples, the gameplay video is decoded and rendered for display by the client device.

In some examples, the streaming server is configured to receive input data from the client device over a data channel. For example, the user may input commands to control the video game, an avatar in the video game, navigate a video game menu, or the like. The input data may be generated at the client device by real-time interaction with the gameplay using an input mechanism for interactivity with the gameplay video as displayed by the client device. For example, the user may use common peripherals such as a keyboard and mouse or a console controller.

In some examples, the request to establish a session of gameplay comprises a first requested video game, and wherein the available upgrades are further based on the video game. In some examples, the identified service level agreement is the minimum settings or optimal settings to establish the session of gameplay.

In some examples, the available upgrades alter at least one of a number of computing processing units, number of graphics processing units, bandwidth, video bitrate, audio bitrate, ray tracing, geometry processing, vector graphics, shaders, texture quality, field of view, depth of field, lens flare, motion blur, anisotropy, gamma correction, color precision, NPC density, or Vsync. This should not be taken to be an exhaustive list of available upgrades, but an example of upgrades that are possible. Individual items from this list can be taken, in any combination, to form a list of available upgrades to be present to the user. Some of the items in the list of available upgrades may not be compatible with the user device and therefore some of items may be removed to create a second list of available upgrades compatible with the user device.

In another approach, there is provided a non-transitory computer-readable medium, having instructions recorded thereon for establishing a session of gameplay in a cloud computing system. When executed, the instructions cause a method to be carried out, the method (and therefore instructions) comprise receiving a request to establish a session of gameplay on a user device; retrieving a user profile associated with a user of the user device, wherein the user profile identifies a service level agreement for the session of gameplay; establishing the session of gameplay based on the identified service level agreement; evaluating the service level agreement to determine a first list of available upgrades to the session of gameplay; and providing a user interface to the user, wherein the user interface allows selection of the determined available upgrades.

In another approach, there is provided an apparatus for establishing a session of gameplay in a cloud computing system, the apparatus comprising a processor configured to receive a request to establish a session of gameplay on a user device; retrieve a user profile associated with a user of the user device, wherein the user profile identifies a service level agreement for the session of gameplay; establish the session of gameplay based on the identified service level agreement; evaluate the service level agreement to determine a first list of available upgrades to the session of gameplay; and provide a user interface to the user, wherein the user interface allows selection of the determined available upgrades.

In another approach there is provided a system for establishing a session of gameplay in a computing system, the system comprising: means for receiving a request to establish a session of gameplay on a user device; means for retrieving a user profile associated with a user of the user device, wherein the user profile identifies a service level agreement for the session of gameplay; means for establishing the session of gameplay based on the identified service level agreement; means for evaluating the service level agreement to determine a first list of available upgrades to the session of gameplay; and means for providing a user interface to the user, wherein the user interface allows selection of the determined available upgrades.

In another approach there is provided a device for establishing a session of gameplay in a cloud computing system, the device comprising a network module and a control module. The network module, for example a transceiver, is configured to receive a request to establish a session of gameplay on a user device from the user device; and send instructions to a server in the cloud computing system to establish the session of gameplay. The control module is configured to retrieve a user profile associated with a user of the user device, from storage in the cloud computing system, wherein the user profile identifies a service level agreement for the session of gameplay; establish the session of gameplay based on the identified service level agreement; evaluate the service level agreement to determine a first list of available upgrades to the session of gameplay; and provide a user interface to the user, wherein the user interface allows selection of the determined available upgrades.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Methods and systems are provided herein for provisioning or establishing a session of gameplay in a cloud-based computing system (e.g., a cloud gaming system) not local to the user and providing upgrades to improve the QoS or QoE for the user's gameplay session.

Figure 1A:
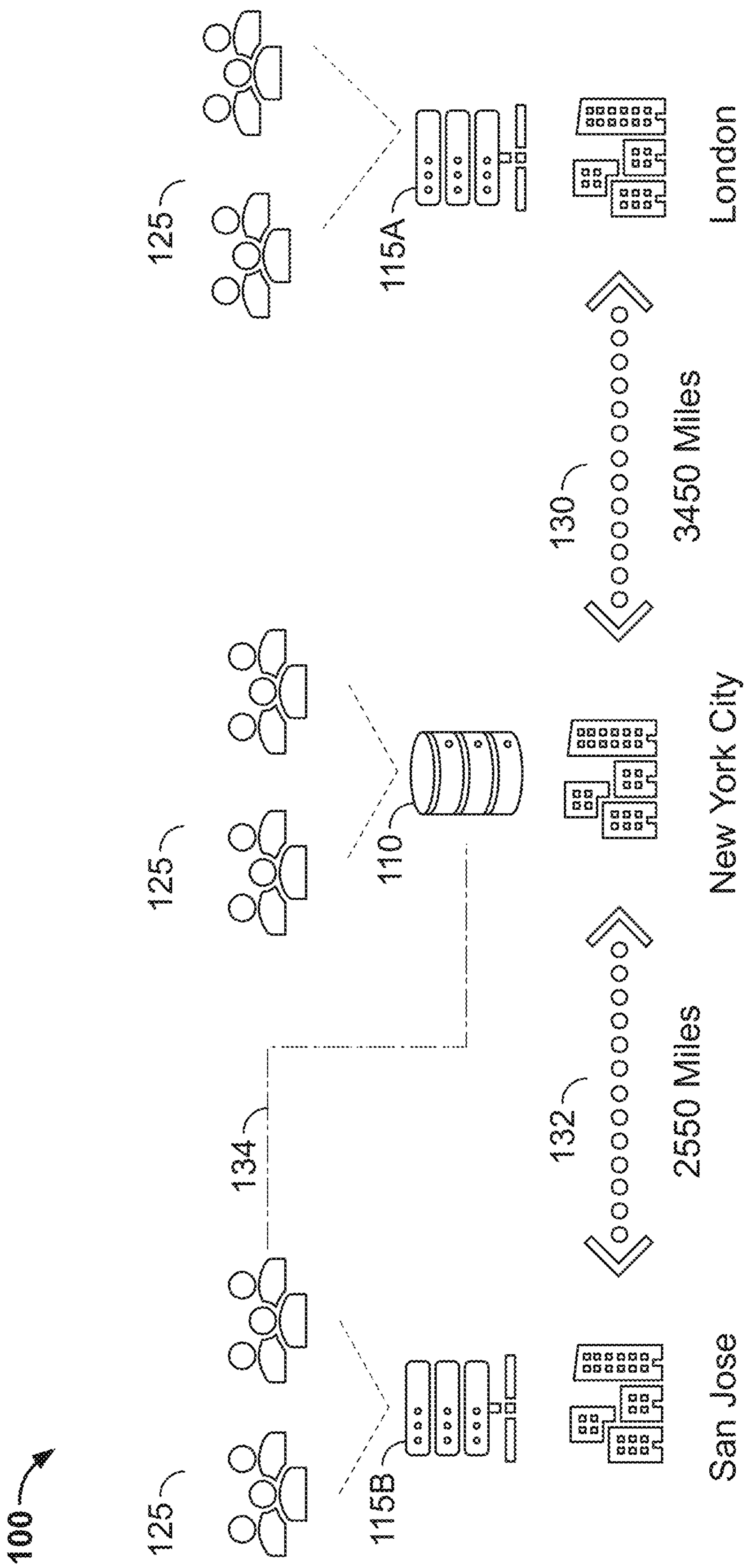
FIGS. 1A-1C illustrate exemplary cloud computing/gaming systems, in accordance with some embodiments of the disclosure.
Figure 1B:
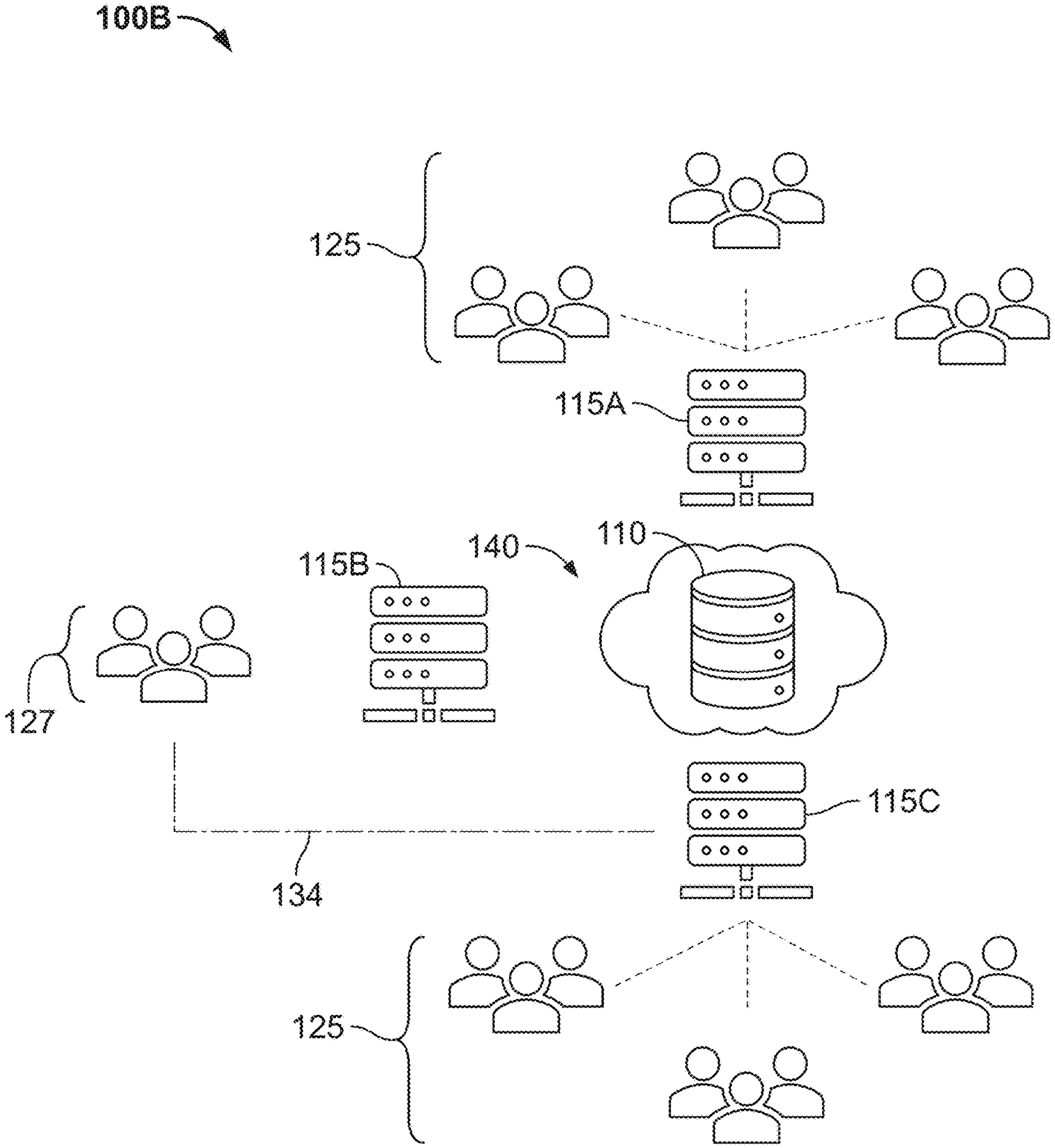
Figure 1C:
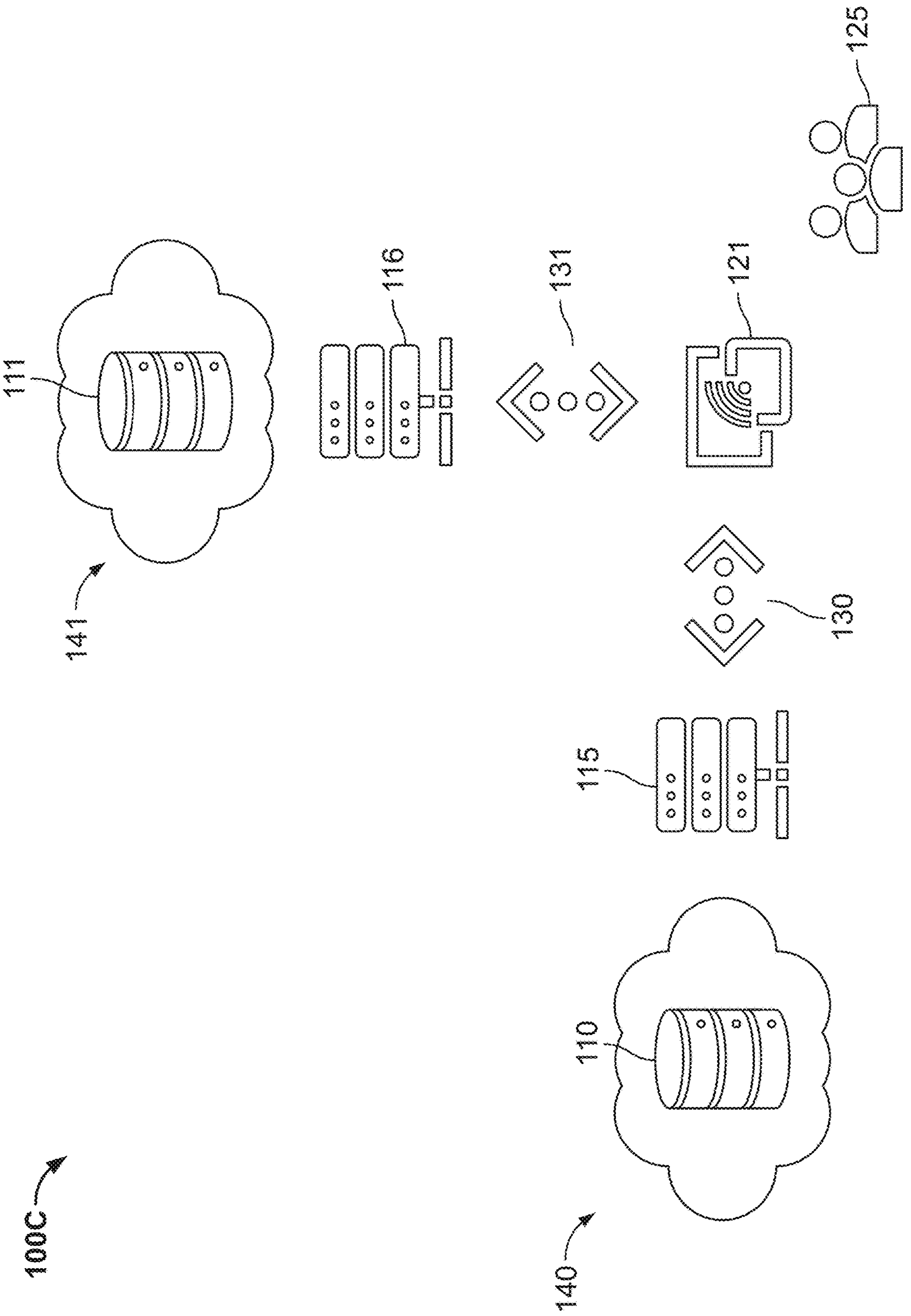

FIGS. 1A, 1B and 1C illustrate exemplary cloud gaming delivery systems, in accordance with some embodiments of the disclosure. Shown is a system 100, the system 100 may comprise parts that may be referred to as a cloud gaming delivery system, a content delivery system, a hyper-cloud provider, or an edge network, as will be explained in more detail below. Network 100 comprises a central server 110 and two satellite servers or "nodes" 115A, and 115B, although, in practice, there are typically 10s or 100s of satellite servers or nodes. In some examples, the central server 110, is the primary server for a content source, such as a media content item (e.g., a video game) for a cloud gaming platform, user profile data, and service level agreement details. In some examples, the central server 110 may be located a considerable distance from the node servers. For example, as shown in FIG. 1A, the central server may be located in New York City and is connected to a first node server 115A hosted in, for example, London 3450 miles away via high-speed data link 130 and to a second node server, 115B hosted in, for example, San Jose 2550 miles away via high-speed data link 132. In some examples, the first and second node servers 115A, and 115B comprise a copy of the content of the central server 110, known as a local copy or version. In some examples, the central server 110 and the node servers 115A, and 115B comprise a plurality of compute units, graphical compute units, memory, and the like to provide cloud gaming services, as mentioned above. In some examples, the servers host virtual machines that users 125 connect to. The components of servers 110, 115A and 115B can be configured in virtual machines (see FIG. 9) to provide a different level of QoS/QoE for the video game that is requested by a plurality of users 125. For example, central server 110 may comprise computing units (e.g., processors or cores of a processor), graphical compute units, memory, and the like at varying clock speeds (e.g., 0.5-6 GHz), a number of cores, memory interfaces (e.g., DDR5, GDDR5, etc.), memory clock speeds (e.g., 5.0 Gbps), memory bandwidth (e.g., 80 GB/s), and the like to provide varying levels of QoS/QoE to the users; as will be described in more detail below. Each server 110, 115A-B, may have the same configuration or a different configuration based on the demographic of users 125 in that locality. The servers 110, 115A, and 115B are compatible with known real-time transport protocols (RTP), such as web real-time communication (WebRTC), and adaptive bitrate stream technologies (e.g., MPEG-DASH, Adobe HTTP Dynamic Streaming, Apple HTTP Live Streaming, Microsoft Smooth Streaming, QuavStreams Adaptive Streaming over HTTP, upLynk, or the like) to deliver the cloud gaming services.

Each of central server 110, first node server 115A and second node server 115B provide the content stored thereon to a plurality of users 125. In some examples, it is the users computing devices or gaming applications that are connected to the servers. Said gaming applications support real-time protocols (RTPs), e.g. WebRTC, and need to communicate to the servers so that the users can request improvements to their service level agreements (SLAs), before, during, or after a request to establish a session of gameplay. Typically, the plurality of users 125 connect to the nearest geographical server in the first instance, as this usually results in the lowest ping, latency and jitter between the user and the server, however, a requested upgrade to the current SLA may only be achievable on a more distant server due to congestion, bandwidth limitations, or capabilities of the local server. In some examples, the upgrade request involves moving the users 125 connection to the nearest geographical server to improve on ping, latency, jitter or the like.

In some exemplary situations, there is provided a method for establishing a session of gameplay in cloud computing system 100. The method comprises receiving a request to establish a session of gameplay on a user device. For example, the user 125 may select a video game to play that is hosted on a cloud computing server 100. The method further comprises retrieving a user profile associated with a user 125 of the user device, wherein the user profile identifies a service level agreement for the session of gameplay. The service level agreement is representative of the content the user can access on central server 110 or secondary servers 115A-B and the level of service the user has for all content (e.g., account-wide service level agreement), or on a per content item basis. The method further comprises establishing the session of gameplay based on the identified service level agreement and evaluating the service level agreement to determine a first list of available upgrades to the session of gameplay. For example, the user may have a service level agreement that enables the user to play a particular video game at the minimum recommended hardware, however, the cloud computing system 100 has additional compute resources (e.g., cores, threads, memory, graphics compute units, and the like) available on the central server 100 or an edge server (e.g., secondary servers 115A-B), which the user can upgrade to use for the requested session of gameplay. Accordingly, the method comprises providing a user interface to the user, wherein the user interface allows the selection of the determined available upgrades.

In some exemplary situations, while users 125 are connected to the system 100 the evaluation of the service level agreement is carried out in parallel to the session of gameplay. For example, upgrades may become available during the session of gameplay, or upgrades may be recommended for a particular level, an event within a level, or while in multiplayer mode, and the user can be notified that upgrades are available during a session of gameplay. In other words, the evaluation of the service level agreement, and the determination of available upgrades, can be carried out before, during, or after the provisioning of gameplay to the user device.

FIG. 1B illustrates another exemplary system 100B, in accordance with some embodiments of the disclosure. Shown is a cloud computing system 100B comprising a central server 110 hosted in the cloud 140. The central server 110 is connected to three satellite servers or nodes 115A, 115B and 115C. A plurality of users 125 and 127 are connected to the nodes 115A, 115B, or 115C and are receiving multimedia content, such as video game content. As shown in FIG. 1B, the users 127 are also connected to node 115C via connection 134. Connection 134 is shown to illustrate, in some examples, that establishing the session of gameplay comprises establishing, over a network, a peer-to-peer connection between a streaming server (e.g., server 115C) and the user device. For example, user 127 may be connected to server 115B, however, after receiving an upgrade request, server 115B hands off the connection to a server better suited to meet the updated service level agreement user 127 has. The method further comprises transmitting, over the peer-to-peer connection from the streaming server 115C to the client device/user 127, gameplay video and audio generated from the session of gameplay. In some examples, the peer-to-peer connection is a real-time protocol connection, such as web real-time communication (WebRTC) or the like. An appropriate server or apparatus can be utilized to perform the methods herein.

FIG. 1C illustrates another exemplary cloud computing system 100C, in accordance with some embodiments of the disclosure. Shown is a cloud computing system 100C comprising a first central server 110 hosted in the cloud 140. The first central server 110 is connected to a first satellite server or node 115, which is in turn connected to a user device 121 via a first data connection 130. The first central server 110 is associated with the first over-the-top, OTT, provider's platform. The content delivery network 100C also comprises a second central server 111 hosted in the cloud 141. The second central server 111 is connected to a second satellite server or node 116, which is in turn connected to a user device 121 via a second data connection 131.

In some examples, the method further comprises receiving a user selection of at least one available upgrade at the first central server 110 hosted in the cloud 140 and updating the service level agreement on the user profile to comprise at least one selected available upgrade. After user selection of an upgrade, which improves the user's QoS or QoE, the service level agreement is updated to reflect the selection by the user. The method further comprises determining that the first central server 110 cannot carry out the updated service level agreement, and therefore the method comprises re-establishing the session of gameplay based on the updated service level agreement, or, continuing the session of gameplay with the selected upgrade on a second central server 111 hosted in the cloud 141. In some examples, the updated service level agreement applies to a second user profile (e.g., all users 125) during the session of gameplay. For example, the user may select a higher frame rate, bandwidth, or the like for a competitive multiplayer session, which also applies to the user's teammates.

The methods and systems described herein apply to user device 121 and one or more servers such as first and second central server 110 or 111, which may be a computing device (shown in more detail in FIGS. 4 and 9-11). In some examples, the user device is a personal computer (PC), a home gateway, a smart appliance (such as a smart TV), a smartphone, laptop, or tablet. The user device 121 is configured to receive multimedia content from either the first central server 110 or second central server 111 via first node 115 or second node 116; and is further configured to receive user inputs. In some examples, the first and second central servers 110 and 111 comprise the same or similar versions (copies) of media content requested by device 121. For example, each server or node may have a cached copy of the game "Limbo." In some examples, reestablishing the session of gameplay comprises capturing game state data of the gameplay on the first central server 110, and storing the captured game state data; wherein the game state data is used to resume gameplay from the point where the user selected the at least one available upgrade with the updated service level agreement on second central server 111. Therefore, in accordance with the methods described herein, the user device 121 may switch from central server 110 to 111 when the updated service level agreement cannot be met on one server but can be on another. The inputs the user makes on the user device 121 can be mirrored through to both servers 110, and 111 to ensure the game (e.g., Limbo) is running with the updated service level agreement before the switch from one server to the other occurs.

In some examples, at least one available upgrade comprises an expiration. For examples, the upgrade may only be available for a period of time, a level within the video game, during competitive gameplay, while playing with a certain teammate, or directed by the game developers (e.g., the developers force an upgrade for a part of the video game that the user is currently in during their gameplay). After expiration, the service level agreement is updated to remove the at least one selected available upgrade. For example, the user may be reconnected back to the first central server 110.

Some terms used throughout the present specification are given their normal meaning in the art, others are given a special meaning. For clarity, "Gameplay" is often described as the specific way in which players interact with a game, and in particular with video games. Gameplay is often used to describe the pattern defined through the game rules, connection between player and the game, challenges and overcoming them, plot and player's connection with it. Gameplay is also used herein to refer to the graphics and audio elements of a video game, as well as the user's ability to interact with a video game. Statements such as improve the QoS or QoE of the user's gameplay, therefore, refer to visual, audiological, or system-based improvements to how the user interacts a video game.

There are three components to gameplay: "Manipulation rules", defining what the player can do in the game, "Goal Rules", defining the goal of the game, and "Metarules", defining how a game can be tuned or modified; this application focuses on the latter. In video games gameplay can be divided into several types. For example, cooperative gameplay involves two or more players playing on a team. Another example is twitch gameplay which is based around testing a player's reaction times and precision, for example in rhythm games or first-person shooters.

Another example of gameplay includes, but is not limited to, asymmetrical multiplayer in which players can have significantly different roles or abilities from each other—enough to provide a significantly different experience of the game, this can refer to metarules also. In games with light asymmetry, the players share some of the same basic mechanics (such as movement and death), yet have different roles in the game; this is a common feature of the multiplayer online battle arena (MOBA) genre such as League of Legends and DOTA 2, and in hero shooters such as Overwatch and Apex Legends. In games with stronger elements of asymmetry, one player/team may have one gameplay experience (or be in softly asymmetric roles) while the other player or team play in a drastically different way, with different mechanics, a different type of objective, or both. Examples of games with strong asymmetry include Dead by Daylight, Evolve, and Left 4 Dead. Accordingly, certain available upgrades to a user's QoS and QoE may be based on the asymmetry roles within the video game; some roles would not experience a perceivable change in QoS or QoE with high FPS or high fidelity, whereas other may be improved significantly—this can be further defined by the studio or game developer. In some examples, a certain level of QoS or QoE that a user subscribes to (i.e., their service level agreement) may not be applicable to a role within a game, or the game as a whole; accordingly, the service level agreement can be transfer to another user, or, credited for a different session of gameplay—should the service level agreement have an expiration.

Asynchronous multiplayer is a form of multiplayer gameplay where players do not have to be playing at the same time. This form of the multiplayer game has its origins in play-by-mail games, where players would send their moves through postal mail to a game master, who then would compile and send out results for the next turn. Play-by-mail games transitioned to electronic form play-by-email games. These types of asynchronous multiplayer games waned with the widespread availability of the Internet which allowed players to play against each other simultaneously but remains an option in many strategy-related games, such as the Civilization series. Coordination of turns is subsequently managed by one computer or a centralized server; often this genre of games is bottlenecked by computer processing power rather than graphical processing power. Therefore, this is an example of the type of video game that available upgrades would be applied to all users within the session (e.g., one user has a service level agreement for more compute units, which applies to the Asynchronous multiplayer game, and therefore all users benefit form the additional compute resource).

Cooperative video gameplay, often abbreviated as co-op, is a video game that allows players to work together as teammates, usually against one or more non-player character opponents, known as player versus environment (PvE). It is distinct from other multiplayer modes, such as competitive multiplayer modes like player versus player (PvP). In its most simple form, cooperative gameplay modifies the single player mode of a game, sometimes with broader modifications to the story and gameplay. Co-op games can be played over a network via a local area networks or wide area networks, such as in the Destiny and Borderlands series, while other co-op games can be played locally using one or multiple input controllers, with It Takes Two as an example. Some games such as Mario Kart Wii and Call of Duty's co-op modes allow two players from the same console to play with others online. Co-op gameplay has been gaining popularity in video games in recent years, as controller and networking technology has developed. On PCs and consoles, cooperative games have become increasingly common, and many genres of game—including shooter games, sports games, real-time strategy games, and massively multiplayer online games—include co-op modes. Co-op gameplay is therefore a genre of game that would benefit from increased bandwidth, framerate, and the like, but often improvement in graphics and the like is less important to the success of the gameplay from a user's perspective.

Over-the-top services, OTT, have increased in popularity significantly since broadband level internet speeds and bandwidths have become ubiquitous. For example, adaptive streaming is fast becoming the most widely used method for video delivery to end-users over the internet. Cloud gaming is an emerging market, with the likes of Google's Stadia®, Nvidia's GeForce Now® and Sony's PS Now®, which offer remote game streaming as a service (GaaS). Cloud gaming often doesn't require the user to download and install the game, simply subscribe to a service and obtain a license to play the game, or the like. The user's inputs to the game are streamed from the user to the server hosting the game, and the video and sound output from the game are sent to the user.

The video and sound may be streamed via conventional adaptive streaming technologies. For example, the ITU-T P.1203 standard is the first standardized quality of experience model for audio-visual HTTP-based adaptive streaming. Adaptive bitrate streaming is a method of video streaming over HTTP where the source content is encoded at multiple bit rates, each of the different bit rate streams is segmented into small multi-second parts, however, for live-streaming, in particular cloud gaming, the emphasis is typically on reducing lag or latency. The main criterion for the development of better-quality monitoring and adaptation algorithms in adaptive streaming is to reduce the overall required bandwidth while not having any perceivable impact on the video and audio quality—whereas in cloud gaming the video and audio quality can be altered, server-side, to provide a better gaming experience, whether that be higher video quality for better visuals in the game or lower video quality for a better playing experience due to bandwidth limitations at the user side; often bandwidth is maximised to provide the best experience to the user.

However, the current state of the art is that cloud gaming renders games somewhere on a hyper-cloud providers network, such as a server in a data centre, and the game streams are transported over an unmanaged network to the client device. Network operators are exploring ways to partner with game companies and hyper-cloud providers to offer network edge compute resources and managed network services specifically for cloud gaming. Leveraging much better control of network resources with minimal packet loss, jitter and feedback from the managed network to the encoders and cloud gaming platform provides better control of the game QoE. Accordingly, in some examples, the available upgrade comprises routing the user's connection through a managed network to control the packet loss, jitter and the like.

Figure 2:
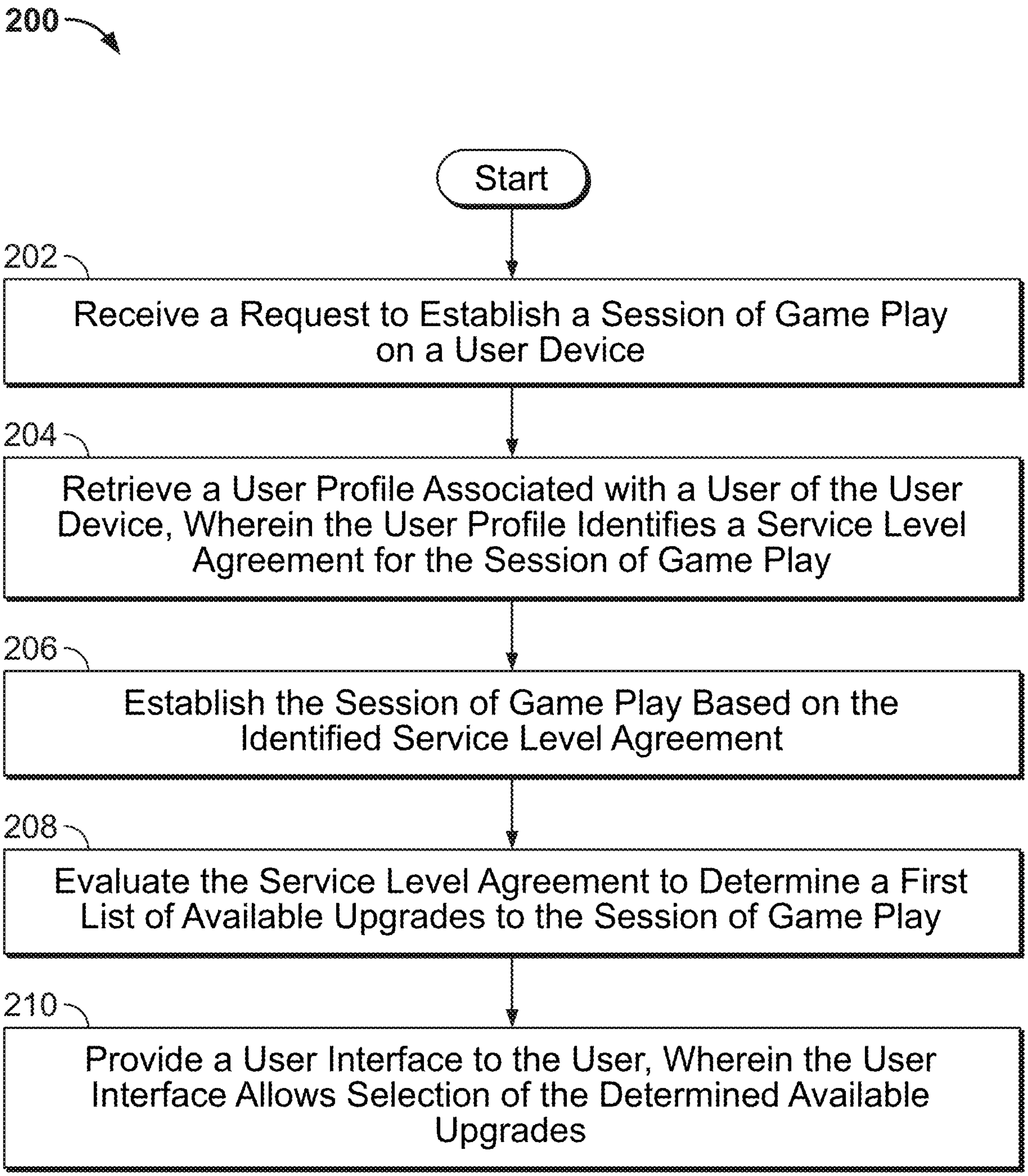
FIG. 2 illustrates an exemplary flowchart of the processing involved in establishing a session of gameplay in a cloud computing system, in accordance with embodiments of the disclosure.

FIG. 2 illustrates an exemplary flowchart of the processing involved in establishing a session of gameplay in a cloud computing system, in accordance with embodiments of the disclosure. Process 200 may be implemented on control circuitry 402, control module 1020, or control circuitry 1120. In addition, one or more actions of process 200 may be incorporated into or combined with one or more actions of any other process or embodiment described herein, such as process 300.

At 202, a request to establish a session of gameplay on a user device is received. For example, the user may select a video game to play that is hosted on a cloud computing server. At 204, a user profile associated with a user of the user device, wherein the user profile identifies a service level agreement for the session of gameplay, is retrieved. The service level agreement is representative of the content the user can access and the level of service the user has for all content, or per content item. For example, the service level agreement may dictate that the games that the user requests are always initialized, in the first instance, in optimum settings regardless of the game title. However, for certain game titles, such as first-person shooter games, the user has preconfigured the settings to maximized the frames per second.

Depending on the game, a much better framerate and resolution can be achieved by leveraging higher-performance CPUs and GPUs. Some games created in recent years support ray tracing, a technique for modeling light transport for use in a wide variety of rendering algorithms for generating digital images. The minimum requirements for these games do not require an expensive GPU for gameplay however the experience is significantly enhanced with these higher-end GPUs. These upgrades come at a high cost. Ray tracing GPUs are significantly more expensive than non-ray tracing GPUs.

In the cloud gaming business, it is not cost-effective to deploy very high-end GPUs to run the games at the absolute highest level of QoE. This is especially true when the delivery is via OTT networking and the absolute highest quality possible can be constrained by network bandwidth and latency limitations. In a managed network, there is a bandwidth cost associated with reserving network resources and running at the highest level of QoE. Supporting a much higher resolution and framerate will significantly place a demand on the networks offering the highest level of quality. Network operators have much more QoE/QoS control vs HCPs delivering the game streams in an OTT fashion. There is therefore an opportunity for network operators to partner with cloud game service providers to host the cloud gaming systems closer to or at the edge of the network.

At 206, the session of gameplay is established based on the identified service level agreement. The establishing of the session of gameplay may further include control circuitry, such as control circuitry 402 as described with reference to FIG. 4, streams, to a client device, and video game data. The control circuitry may encode raw media data of the video game into a streaming media format for streaming to the client device. A unique session ID may be associated with the client device. The control circuitry may use the session ID to retrieve the game session data for that session.

At 208, the service level agreement is evaluated to determine the first list of available upgrades to the session of gameplay. For example, the user may have a service level agreement that enables the user to play a particular video game at the minimum recommended hardware, however, the cloud computing system has additional compute resources (e.g., cores, threads, memory, graphics compute units, and the like) available, which the user can upgrade to use for the requested session of gameplay. In some examples, the unique session ID may be used to determine the first list of available upgrades and prioritize the first list of available upgrades. The evaluation of the service level agreement can be carried out in parallel to the session of gameplay. In particular, if upgrades may become available during the session of gameplay, or upgrades may be recommended for a particular level or while in multiplayer mode, the user can be notified that upgrades are available during a session of gameplay. In other words, the evaluation of the service level agreement, and the determination of available upgrades, can be carried out before, during, or after the provisioning of gameplay to the user device.

At 210, a user interface is provided to the user, wherein the user interface allows the selection of the determined available upgrades. For example, the game application may comprise an interface for requesting a session upgrade comprising a plurality of options corresponding the first list of available upgrades. In some examples, a user could choose to let the game service provider automatically choose when to apply upgrades; which may be an option provided to the user on the first list of available upgrades (e.g., an automatic upgrade mode). For example, if there are credits on the user's account or the like. Some examples automatically determine if the user's success rate in a multiplayer session is poor. If so, perform the upgrade. In some examples, immediately following a cutscene, the upgrade can be performed for the next level of gameplay. In some examples, prior to a game developer mandated scene, (e.g., a final boss fight) an automatic upgrade is made.

In some examples, the request to establish a session of gameplay comprises a first requested video game, and wherein the available upgrades are further based on the video game. In some examples, the identified service level agreement is the minimum settings or optimal settings to establish the session of gameplay.

Process 200 may further comprise evaluating device attributes of the user device; and determining, based on the evaluation of the service level agreement and device attributes, the second list of available upgrades to the session of gameplay. The second list of available upgrades is a subset of the first list of available upgrades. For example, there may be upgrades available that the user device is not compatible with, such as higher frame rate or higher resolution; therefore, those upgrades can be removed from the first list of available upgrades to create a second list of available upgrades.

The actions or descriptions of FIG. 2 may be used with any other embodiment of this disclosure. In addition, the actions and descriptions described in relation to FIG. 2 may be done in suitable alternative orders or in parallel to further the purposes of this disclosure.

Figure 3:
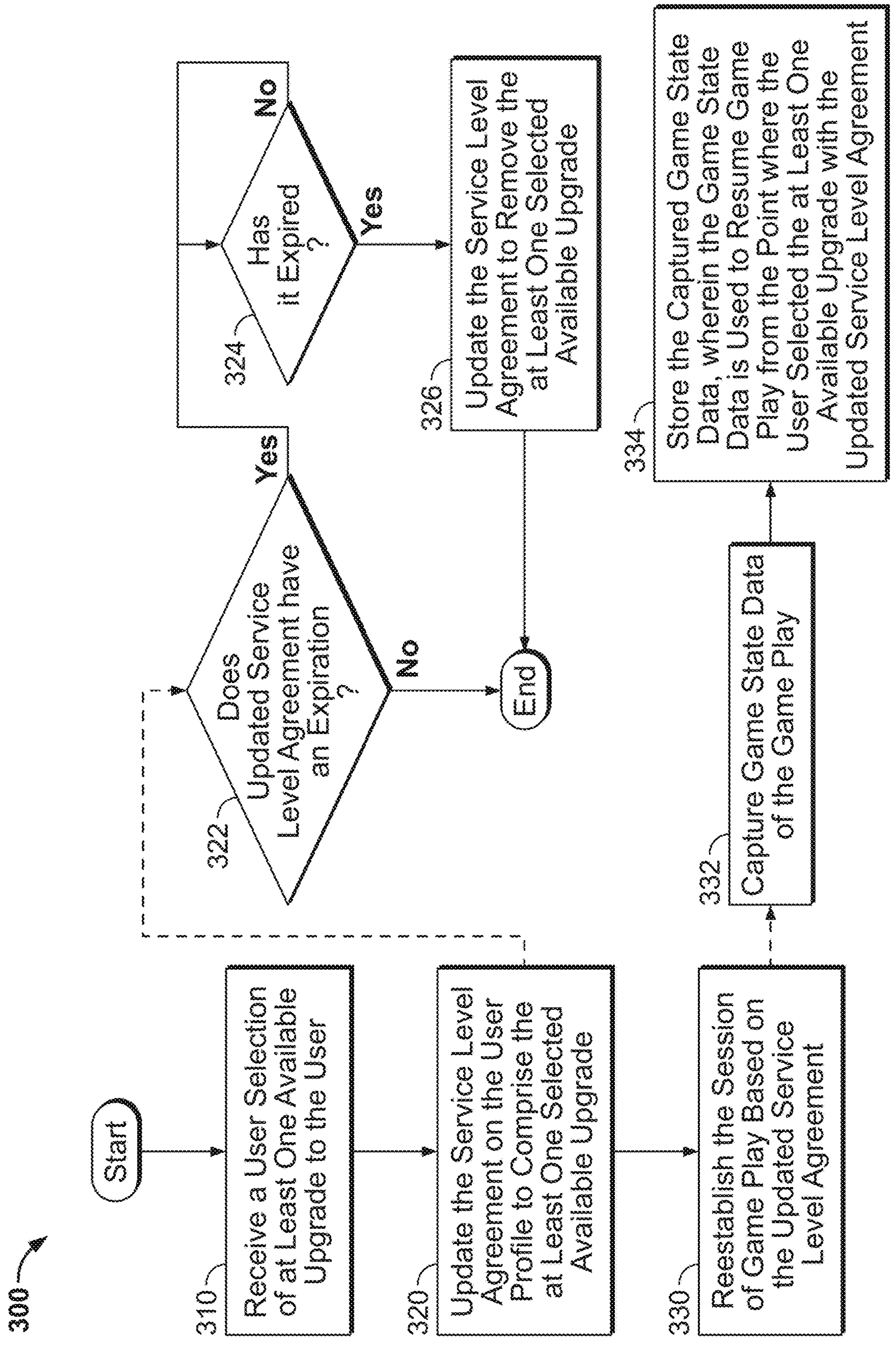
FIG. 3 illustrates an exemplary flowchart of the processing involved in upgrading the service level agreement of a session of gameplay in a cloud computing system, in accordance with some embodiments of the disclosure.

FIG. 3 illustrates an exemplary flowchart of the processing involved in upgrading the service level agreement of a session of gameplay in a cloud computing system, in accordance with some embodiments of the disclosure. Process 300 may be implemented on control circuitry 402, control module 1020, or control circuitry 1120. In addition, one or more actions of process 300 may be incorporated into or combined with one or more actions of any other process or embodiment described herein, such as process 200 and/or 500.

At 310, a user selection of at least one available upgrade to the user is received. At 320, the service level agreement is updated in the user profile to comprise at least one selected available upgrade. After user selection of an upgrade, which improves the user's QoS or QoE, the service level agreement is updated to reflect the selection by the user.

An optional decision process of process 300, starts at 322, where it is determined whether or not the updated service level agreement has an expiration. The updated service level agreement may identify the session ID of the user's current session and determine that the session ID is to be provided with an upgrade for a particular level, game, session of gameplay, or time—which is a non-exhaustive list; collectively referred to as expiration timers. If the answer to 322 is yes, process 300 proceeds to 324. If the answer to 322 is no, this optional decision process, starting at 322, ends or process 300 continues to 330. The optional decision process of process 300 is carried out in parallel to the rest of process 300.

At 324, it is determined whether or not the timer has expired. If it is determined that the timer has not expired, this branch of process 300 waits until such a time that the timer has expired. When the timer has expired, the process continues to 326. At 326, the service level agreement is updated to remove at least one selected available upgrade. Then the process 300 continues to 330.

At 330, the session of gameplay is reestablished based on the updated service level agreement. In some examples, the updated service level agreement also applies to a second user profile during the establishing session of gameplay. For example, the user may select a higher frame rate, bandwidth, or the like for a competitive multiplayer session, which also applies to the user's teammates. The updated service level agreement can comprise details of the selected upgrade, or if the process 300 ran through optional branch 322 in parallel, the removal of the selected upgrade.

In some examples, reestablishing the session of gameplay comprises some further processes, starting at 332. At 332, the game state data of the gameplay is captured. At 334, the captured game state data is stored, wherein the game state data is used to resume gameplay from the point where the user selected at least one available upgrade with the updated service level agreement.

Moreover, the system (i.e., control circuitry 402) can monitor the video game data for optimal positions (so-called "insertion points") to reestablish the session of gameplay. For example, the video game data may include flags or other metadata indications where an insertion point is optimal. Accordingly, process 300 may further comprise determining whether an insertion point has been detected. If not then control circuitry continues to monitor the video game cutscene data until such a point is detected. Alternatively, during a cut scene, or some other non-player interactive part of the video game, the session of gameplay can be reestablished. In all scenarios, reducing the impact If an insertion point has been detected then control circuitry can then carry out the steps described in 332 and 334. This may be accomplished by pausing the streaming of the video game and initiating a second stream. This may also be accomplished using methods described below in connection with FIGS. 7 and 8, in which control circuitry causes a virtual machine manager to initialize new virtual machines, and separate connections to the user device.

The actions or descriptions of FIG. 3 may be used with any other embodiment of this disclosure. In addition, the actions and descriptions described in relation to FIG. 3 may be done in suitable alternative orders or in parallel to further the purposes of this disclosure.

Figure 4:
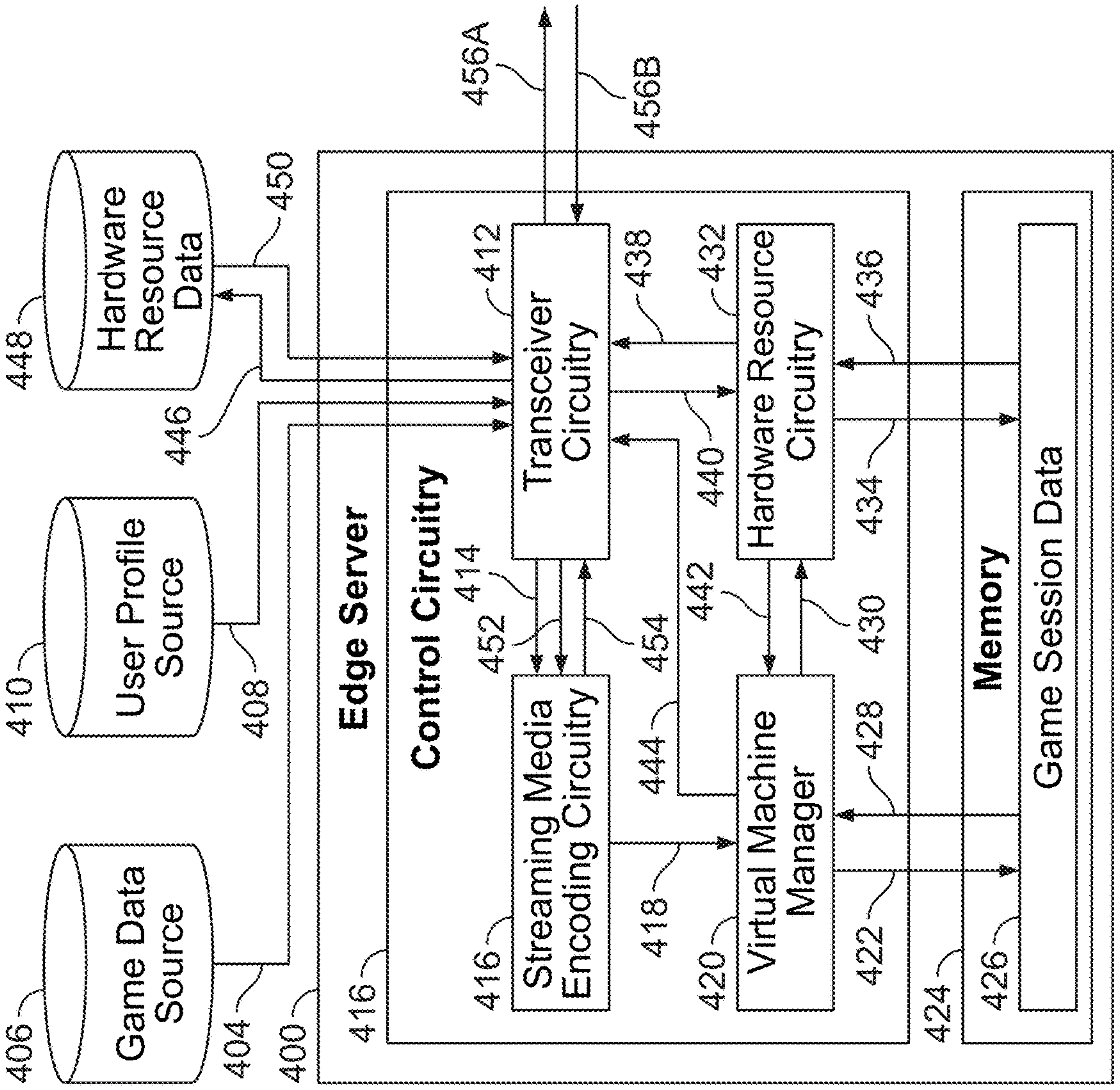
FIG. 4 is a block diagram showing components and data flow therebetween of a system for establishing a session of gameplay in a cloud computing system, in accordance with some embodiments of the disclosure.

FIG. 4 is a block diagram showing components and data flow therebetween of a system for establishing a session of gameplay in a cloud computing system, in accordance with some embodiments of the disclosure. The edge server 400 may be the network node in a cloud computing environment, such as a mobile broadband network, that is responsible for encoding and delivering media content (e.g., a video game) to a client device. The edge server 400 includes control circuitry 402. Control circuitry 402 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 402 may receive 404 raw media data for a video game from a game data source 406 and receive 408 user profile information (comprising the service level agreement for the video game data) from a user profile source 410. The video game data is received using transceiver circuitry 412. Transceiver circuitry 412 comprises a network connection over which data can be transmitted to and received from remote devices, such as an ethernet connection, Wi-Fi connection, mobile broadband interface, or connection employing any other suitable networking protocol. Transceiver circuitry 412, in turn, transmits 414 the received raw media data to streaming media encoding circuitry 416.

Streaming media encoding circuitry 416 encodes the raw media data into a multimedia format suitable for streaming and packages the converted multimedia data using a streaming protocol such as MPEG-DASH or WebRTC.

While encoding the raw media data of the video game by streaming media encoding circuitry 416, transceiver circuitry 412 monitors for user inputs, virtual machine manager 420 initializes a first virtual machine to render the video game using the hardware resources 432. The hardware resources 432 are so selected based on the service level agreement retrieved from the user profile source 410. If the user has selected an available upgrade, as described above, the virtual machine manager 420 transmits 422 a request to memory 424 to store the current game data 426 and initializes a second virtual machine with the stored game data (i.e., the game session data 426 is transfer from the first virtual machine to the second virtual machine). For example, the game session data may relate to a current ability level, experience level, health level, strength, agility, or other characteristics of a user's in-game character.

Game session data 426 may include previous game settings and configuration data reported by the client device. Hardware resource circuitry 432 configures 442 the hardware used by the virtual machine manager 420 to initialize virtual machines, virtual machine manager transmits 430 the video game data to be rendered by the hardware resources to the hardware resource circuitry 432. The hardware resource circuitry 432 configures the required hardware based on the service level agreement retried (or updated) in the user profile source 410. Hardware resource circuitry 432 may also transmit 434 a request to memory 424 to retrieve previous or requested hardware configurations.

The hardware resource circuitry 432 configures the hardware used by the virtual machines initialized by the virtual machine manager 420 to control at least one of the number of computing processing units, number of graphics processing units, bandwidth, video bitrate, audio bitrate, ray tracing, geometry processing, vector graphics, shaders, texture quality, field of view, depth of field, lens flare, motion blur, anisotropy, gamma correction, color precision, NPC density, or Vsync. This should not be taken to be an exhaustive list of available upgrades, but an example of upgrades that are possible. Individual items from this list can be taken, in any combination, to form a list of available upgrades to be present to the user. Some of the items in the list of available upgrades may not be compatible with the user device and therefore some of items may be removed to create a second list of available upgrades compatible with the user device. Not coincidentally, these attributes are also those that can be upgraded, and the hardware resource circuitry 432 is configured to select hardware to provide improvements to these parameters, as requested by the user.

Edge server 400 may determine supplemental information and update the hardware resource data. For example, the edge server 400 may determine network information data, including the type of network over which the client device is connected to edge server 400, a maximum transmission rate observed by the client device, or other information related to the connection between the client device and edge server 400. Transceiver circuitry 412 receives the network information data and may, alternatively or additionally, conduct tests on the connection between the client device and edge server 400. Transceiver circuitry 412 may transmit a test packet, or "ping" to the client device.

The transceiver circuitry 412 is configured to receive 456B input data from a client device over a data channel. For example, the user may input commands to control the video game, an avatar in the video game, navigate a video game menu, or the like. The input data may be generated at the client device by real-time interaction with the gameplay using an input mechanism for interactivity with the gameplay video as displayed by the client device. For example, the user may use common peripherals such as a keyboard and mouse or a console controller. The input data is transmitted to the virtual machine manager and input into the virtual machine to give the user the effect of controlling the virtual machine directly.

Figure 5:
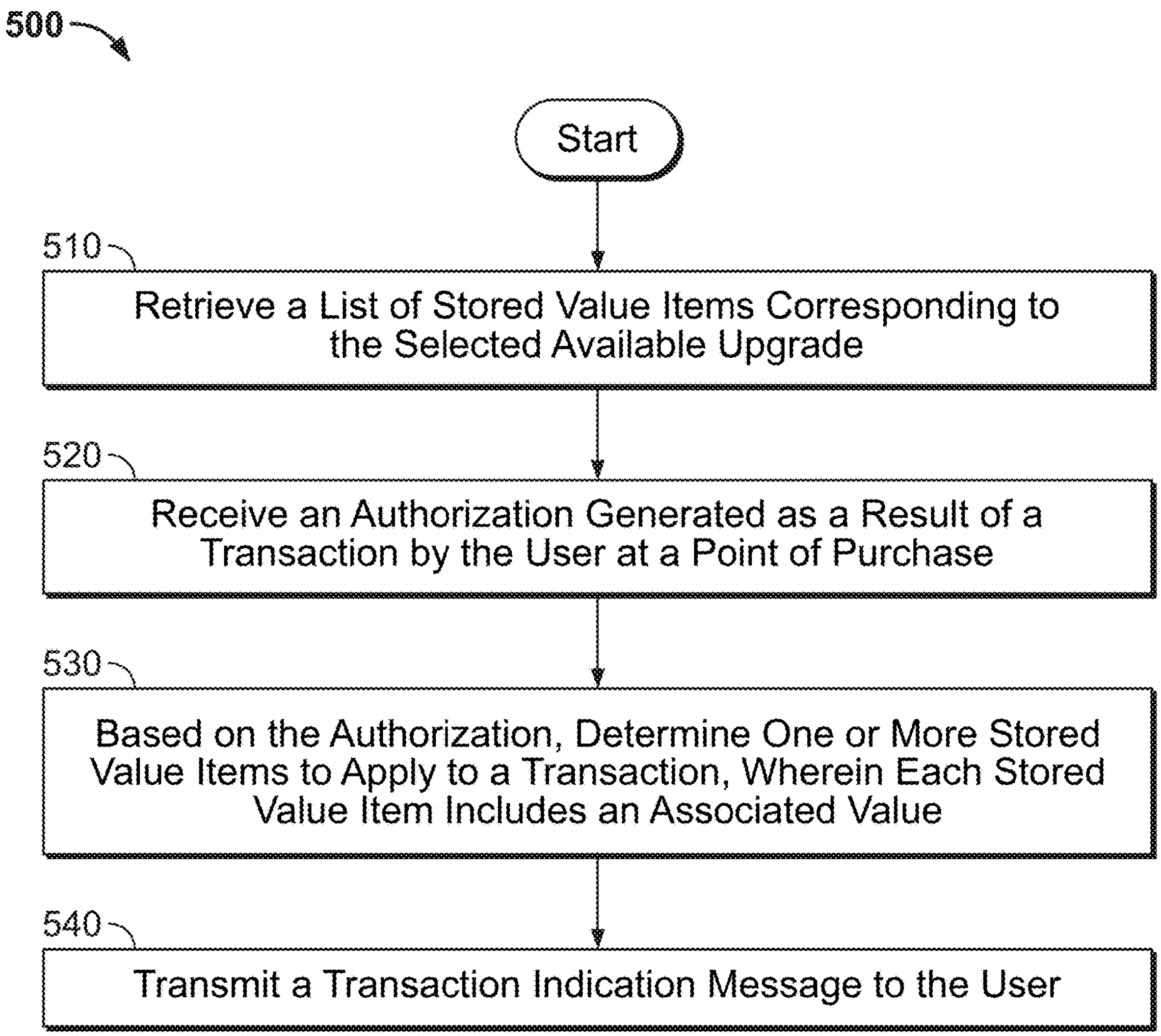
FIG. 5 illustrates an exemplary flowchart of the processing involved in transactions for upgrades, in accordance with some embodiments of the disclosure.

FIG. 5 illustrates an exemplary flowchart of the processing involved in transactions for upgrades, in accordance with some embodiments of the disclosure. Process 500 may be implemented on control circuitry 402, control module 1020, or control circuitry 1120. In addition, one or more actions of process 500 may be incorporated into or combined with one or more actions of any other process or embodiment described herein, such as process 200.

At 510, a list of stored value items is retrieved corresponding to the selected available upgrade. For example, the available upgrade may have an associated cost, whether that be a monetary value (i.e., can be purchased by the user), a redeemable by a token (i.e., pre-purchased tokens, or credits applied to the user profile in some manner), or the like.

At 520, an authorization, generated as a result of a transaction by the user at a point of purchase, is received. For example, the user may have pre-purchased tokens that can be redeemed for the available upgrade, may have purchased the upgrades prior to the request to establish the session of gameplay or on a separate system, or may purchase the upgrades at the time of the request. The methodology of the transaction is not deterministic by the methodologies described herein. Moreover, the transaction need not be for money at all, and merely the offer of available upgrades and acceptance could be all that is contained in the transaction authorization.

At 530, based on the authorization, one or more stored value items to apply to a transaction is determined, wherein each stored value item includes an associated value. At 540, a transaction indication message is transmitted to the user. For clarity, in some examples, the transaction by the user at a point of purchase was carried out before the request for establishing a session of gameplay. The associated value can be expressed as a currency amount or an improved value score.

A stored-value item is a coupon for use in transactions with a specified merchant, for a specified video game, a portion of a specified video game, or for a specified time. In some examples, the coupon is obtained after the consumption of a media item by the user. For example, the user may be presented with an option to watch an advertisement for a reward, such as an upgrade, a coupon to be deemed for an upgrade, or a token(s) which can be accrued to redeem an upgrade.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6A:
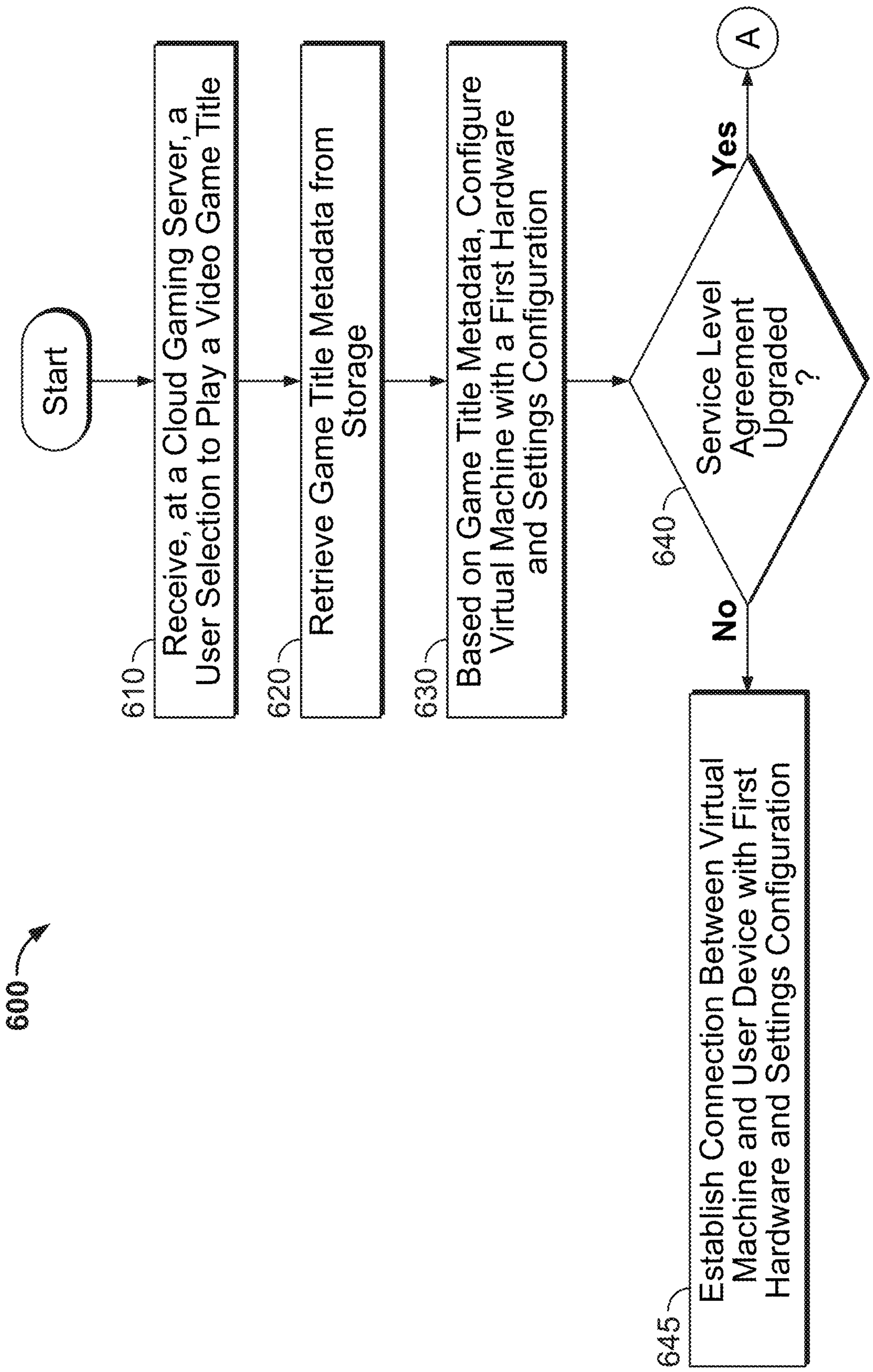
FIGS. 6A and 6B illustrate exemplary flowcharts of the processing involved in establishing a connection between virtual machine and user device, in accordance with some embodiments of the disclosure.
Figure 6B:
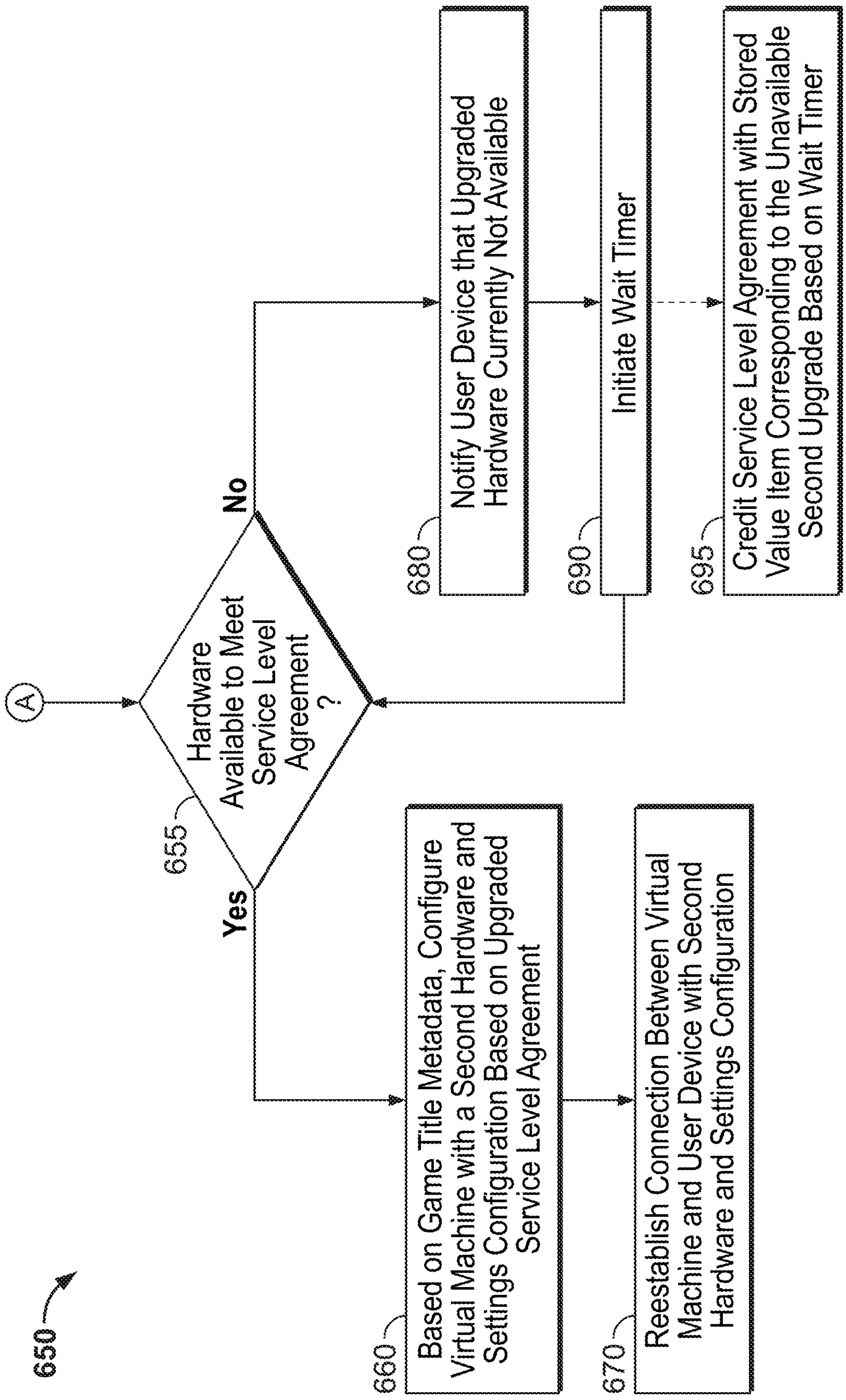

FIGS. 6A and 6B illustrate exemplary flowcharts of the processing involved in establishing a connection between virtual machine and user device, in accordance with some embodiments of the disclosure. Process 600 may be implemented on control circuitry 402, control module 1020, or control circuitry 1120. In addition, one or more actions of process 600 may be incorporated into or combined with one or more actions of any other process or embodiment described herein, such as process 200 or 650.

At 610, a user selection to play a video game title is received at a cloud gaming server. At 620, game title metadata is retrieved from storage. At 630, based on game title metadata, a virtual machine is configured with a first hardware and settings configuration. For example, the game metadata may comprise details on how to configure the hardware to obtain the minimum developer/studio requirements on a number of computing processing units, number graphics processing units, bandwidth, video bitrate, audio bitrate, ray tracing, geometry processing, vector graphics, shaders, texture quality, field of view, depth of field, lens flare, motion blur, anisotropy, gamma correction, color precision, NPC density, Vsync, or the like.

At 640, is it determined whether or not the service level agreement has been upgraded. If the service level agreement has been updated, that is an upgrade (or downgrade) has been made by the user, then process 600 continues via "A" to process 650, as described below. If the service level agreement has not been updated then process 600 continues on to 645.

At 645, a connection between a virtual machine and user device is established, with a first hardware and settings configuration. The virtual machine is configured to receive input data from the client device over a data channel. For example, the user may input commands to control the video game, an avatar in the video game, navigate a video game menu, or the like. The input data may be generated at the client device by real-time interaction with the gameplay using an input mechanism for interactivity with the gameplay video as displayed by the client device. For example, the user may use common peripherals such as a keyboard and mouse or a console controller.

Process 650 may be implemented on control circuitry 402, control module 1020, or control circuitry 1120. In addition, one or more actions of process 600 may be incorporated into or combined with one or more actions of any other process or embodiment described herein, such as process 200 or 600.

At 655, it is determined whether or not there is hardware available to meet the service level agreement. If it is determined that there is available hardware to meet the service level agreement, process 650 continues to 660. If it is determined that there is no available hardware to meet the service level agreement, process 650 continues to 680.

At 660, based on game title metadata, a virtual machine is configured with a second hardware and settings configuration based on an upgraded service level agreement. Put another way, the user begins playing the requested video game on a virtual machine with the pre-configured first hardware and settings (which may be, for example, the video game recommended settings). After receipt of an upgrade request by the user, and with the available hardware to fulfil that request, the virtual machine is reinitialized with second hardware and settings configuration (different to the first hardware and settings configuration) to meet the request. In this way, the user's video gameplay can continue with minimal interruption. At 670, a connection is reestablished between the virtual machine and user device with second hardware and settings configuration.

Alternatively, the user begins playing the requested video game on a first virtual machine with the pre-configured first hardware and settings (which may be, for example, the video game recommended settings). After receipt of an upgrade request by the user, and with the available hardware to fulfil that request, a second virtual machine is initialized with second hardware and settings configuration (different to the first hardware and settings configuration) to meet the request. In this way, the user's video gameplay can continue uninterrupted. The second virtual machine is initialized based on the stored game data at the time of the user's request. The inputs the user makes to the first virtual machine can be copied to the second virtual machine, such that the first and second virtual machines are at the same point in the video game, ready for a seamless transition, from the user's point of view, from the first virtual machine to the second virtual machine. A new connection can be established between the second virtual machine and the user's device.

In the scenario that there is no available hardware to fulfil the user's request to upgrade, or rather the update service level agreement, process 650 moves to 680. At 680, a user device is notified that upgraded hardware is currently not available and, at 690, a wait timer is initiated. The wait timer may not be present, however, it is considered sensible to delay rechecking for available hardware until some arbitrary time period has elapsed. After the timer has elapsed, process 600 returns to 655.

Optionally, process 650 also comprises 695, wherein the service level agreement is credited with the stored value item corresponding to the unavailable second upgrade based on the wait timer. For example, if the user purchased the upgrade (at the time of the upgrade request or otherwise) the user's profile will be credited for a pro-rata (based on the time it was unavailable) amount of the purchase while the upgrade was not available or in full. By way of further example, if the user purchases an upgrade in graphics for 1 hour, but the hardware to carry out the upgrade was unavailable for 30 minutes, half the value of the purchase can be credited. The purchase need not involve currency, it can be tokens, a coupon, or a free offer from the developer, for example.

The actions or descriptions of FIGS. 6A and 6B may be used with any other embodiment of this disclosure. In addition, the actions and descriptions described in relation to FIGS. 6A and 6B may be done in suitable alternative orders or in parallel to further the purposes of this disclosure.

Figure 7:
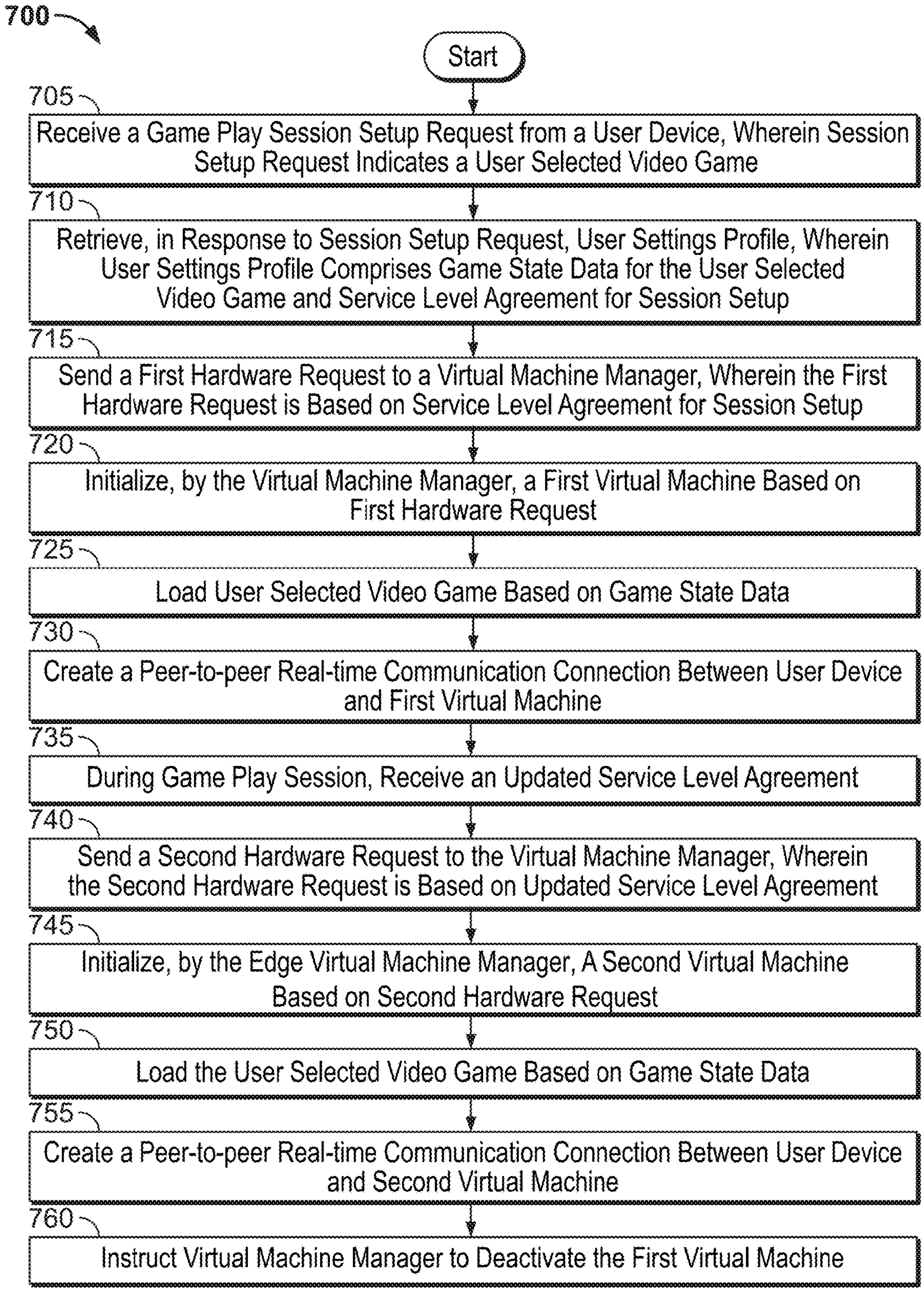
FIG. 7 illustrates an exemplary flowchart of the processing involved in virtual machine management, in accordance with some embodiments of the disclosure.

FIG. 7 illustrates an exemplary flowchart of the processing 700 involved in virtual machine management, in accordance with some embodiments of the disclosure. Process 700 may be implemented on control circuitry 402, control module 1020, or control circuitry 1120. In addition, one or more actions of process 700 may be incorporated into or combined with one or more actions of any other process or embodiment described herein, such as process 600. Process 700 may be implemented in a cloud gaming system, communicatively coupled to a user device.

At 705, a gameplay session setup request is received from a user device, wherein the session setup request indicates a user-selected video game. For example, a user may select a video game to play, and their user device sends a request to a cloud gaming system to establish or setup a session for the gameplay. At 710, in response to the session setup request, a user settings profile is retrieved, wherein the user settings profile comprises game state data for the user-selected video game and service level agreement for session setup. For example, after receipt of the user-selected video game, the cloud gaming system retrieves, from a user profile source, the user's save game data for the video game and an indication of the service level agreement. The service level agreement is used by the cloud gaming system to configure a virtual machine.

At 715, a first hardware request is sent to a virtual machine manager, wherein the first hardware request is based on the service level agreement for session setup. At 720, the first virtual machine is initialized, by the virtual machine manager, based on the first hardware request. For example, based on the service level agreement, which may require that frames-per-second is maximised, or that the video game is launched with optimum settings, the cloud gaming system, in particular the virtual machine manager, configures the hardware to match the requirements of the service level agreement. At 725, a user-selected video game is loaded based on game state data. At 730, a peer-to-peer real-time communication connection is created between the user device and the first virtual machine.

At 735, during the gameplay session, an updated service level agreement is received. At 740, a second hardware request is sent to the virtual machine manager, wherein the second hardware request is based on an updated service level agreement. In some examples, process 700 ends after 740, wherein the first virtual machine is reconfigured with hardware suitable to achieve the requirements of the updated service level agreement. In other examples, process 700 continues on to 745.

At 745, a second virtual machine is initialized by the virtual machine manager, based on a second hardware request. For example, while the user is playing the video game, being rendered by first virtual machine, a second virtual machine can be initialized with a hardware configuration suitable to meet the requirements of the updated service level agreement. At 750, the user-selected video game is loaded on the second virtual machine based on current game state data. For example, upon receipt of the user request to upgrade on their device, a save game state is made for the video game the user is currently playing and stored; this save game state is used to initialize the second virtual machine's video game at the same point as the first virtual machine. At 755, a peer-to-peer real-time communication connection is created between the user device and the second virtual machine. The user is switched from the first virtual machine to the second virtual machine at a point in the video game that is convenient and does not interrupt gameplay. For example, a good switch point is during a loading screen, a cutscene, or while entering an in-game menu. At 760, the virtual machine manager is instructed to deactivate the first virtual machine.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
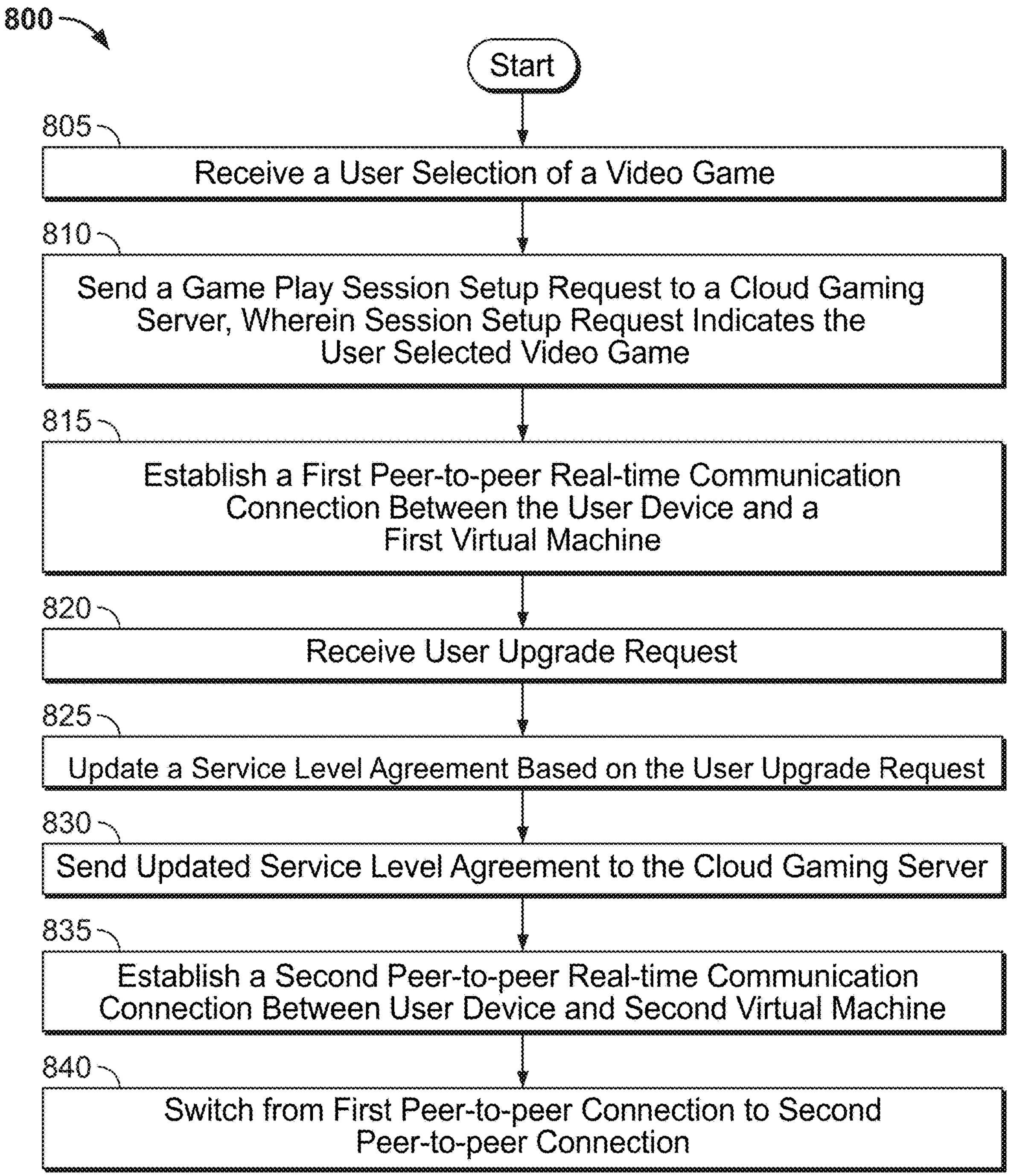
FIG. 8 illustrates an exemplary flowchart of the processing involved in updating service level agreement, in accordance with some embodiments of the disclosure.

FIG. 8 illustrates an exemplary flowchart of the processing involved in updating service level agreement, in accordance with some embodiments of the disclosure. Process 800 may be implemented on control circuitry 402, control module 1020, or control circuitry 1120. In addition, one or more actions of process 800 may be incorporated into or combined with one or more actions of any other process or embodiment described herein, such as process 700. Process 800 may be implemented on a user device, communicatively coupled to a cloud gaming system.

At 805, a user selection of a video game is received. For example, the user device is configured to receive a user input, as described in more detail with reference to FIGS. 10 and 11, to select a video game. At 810, a gameplay session setup request is sent to a cloud gaming server, wherein the session setup request indicates the user-selected video game. From the user selection of a video game, the user device creates a gameplay session setup (e.g., a request to establish a session of gameplay) and send that request to the cloud gaming server. At 815, a first peer-to-peer real-time communication connection is established between the user device and a first virtual machine. After the request is sent, the user device next establishes a connection to a first virtual machine, wherein the virtual machine hosts the video game.

In parallel or after the setup request, at 820, a user upgrade request is received. For example, the user may play the video for a while then decide they want a better service and iniate that request on the user device. At 825, a service level agreement is updated based on the user selection. The user device may update the service level agreement or send a request to the cloud gaming system to update the service level agreement; in either regard, the updated service level agreement reflects the selected upgrade the user has requested. At 830, an updated service level agreement is sent to the cloud gaming server. At 835, a second peer-to-peer real-time communication connection is established between the user device and a second virtual machine. At 840, a switch from the first peer-to-peer connection to the second peer-to-peer connection is performed.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
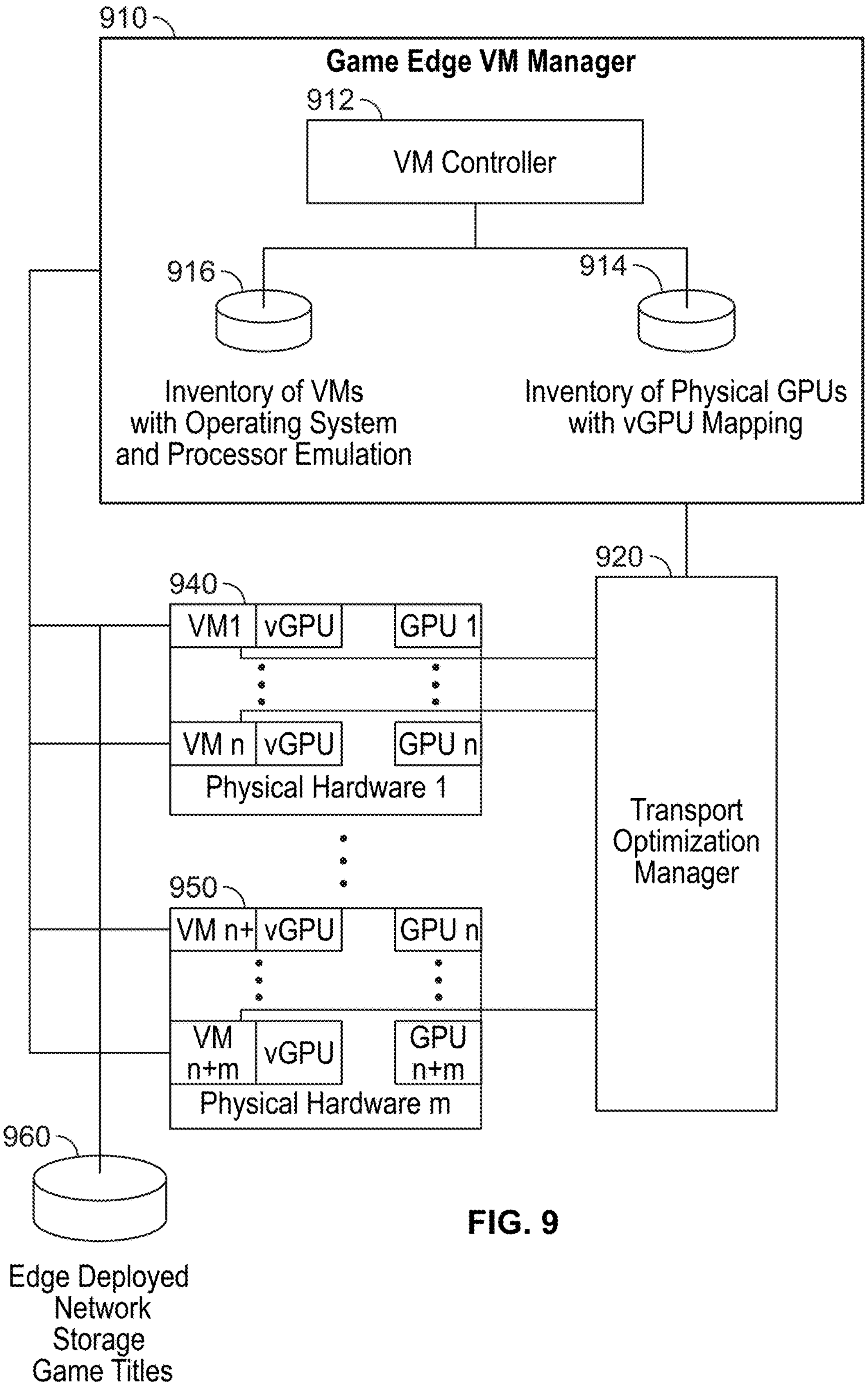
FIG. 9 is a block diagram showing components and data flow therebetween of a Game Edge VM manager, in accordance with some embodiments of the disclosure.

FIG. 9 is a block diagram showing components and data flow therebetween of a Game Edge virtual machine (VM) manager 910, such as virtual machine manager 432 of FIG. 4, in accordance with some embodiments of the disclosure. The Game VM manager 910 manages all VMs in the cloud gaming system for remote cloud gaming. There is a VM Controller 912, which is communicatively coupled to a database of all VMs 916 with their configured operating system and processor emulation. The VM controller 912 is also communicatively coupled to an inventory of physical GPUs with vGPU mapping 914. All physical hardware along with their configured VMs are communicatively coupled to the entire game title library 960 stored locally at the edge location.

In some examples, Game Edge VM manager 910 comprises interfaces to the Transport Optimization Manager 920 for simulating an upgrade scenario to validate the hardware resources are available prior to determining available upgrades. The transport optimization manager 920 supports running a simulation to determine if the bandwidth and network resources are available to support the transport of the upgraded session. The game edge VM manager 910 is not necessary specifically configured to carry out the methods described here, but existing VM managers, which already comprise interfaces for initializing virtual machines, can be utilized so long as they are instructed on the hardware configuration and game data, by some subsystem. The game edge VM manager 910 may also comprise a Service Upgrade Subsystem (not shown or otherwise incorporated into parts already described here) to support upgrade requests for a game session.

Game Edge VM manager 910 is communicatively coupled to physical hardware and virtual resources 940 and 950. The virtual resources may be partitions of physical hardware resources. The physical resources may contain graphics cards, processors, and other hardware resources. where there is a mixture of higher performance cards down to lower performance cards. The diagram represents both running/in-use VMs 940 and idle VMs, GPUs, vGPUs, and hardware resources 950. For the running VMs, it shows a mapping of the virtual GPU to an in-use VM's virtual GPU. The local network storage containing the entire game library is accessible to the physical hardware and all VMs hosted by the physical hardware.

Figure 10:
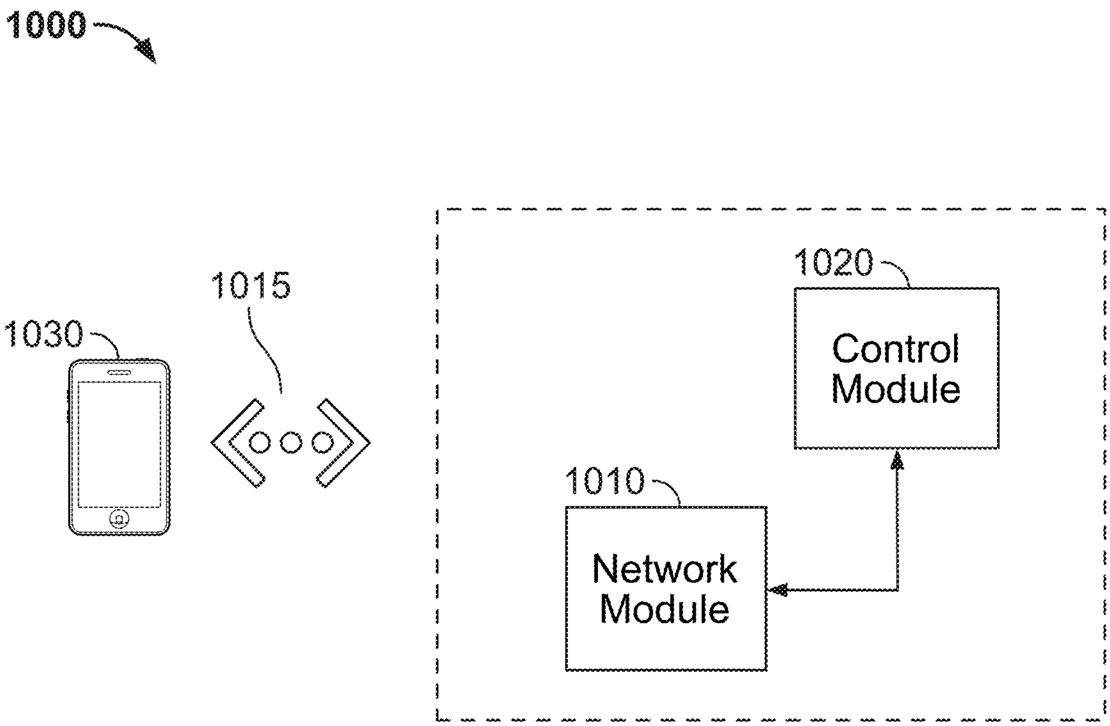
FIG. 10 illustrates an exemplary media transmission device, in accordance with some embodiments of the disclosure.

FIG. 10 illustrates an exemplary media transmission device 1000, in accordance with some embodiments of the disclosure. The media transmission device 1000 comprises a control module 1020, and a network module 1010. The media transmission system may communicate with an additional user device, such as a home game way, smartphone, or other smart devices. The media transmission device 1000, using the network module and control module is configured to request to establish a session of gameplay on the media transmission device; establish a session of gameplay based on a service level agreement; receive the first list of available upgrades to the session of gameplay; and provide a selection of an available upgrade to a cloud gaming server.

In some examples, the media transmission device 1000 communicates with a second user device 1035 via communication link 1015. The communication link 1015 between the media transmission device 1000 and the second user device 1030 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, the communication link 1015 is between the media transmission device 1000 (which may be a device, such as device 121 of FIG. 1C) and the second user device 1030. In some examples, the media transmission device 1000 may receive a list of available upgrades and transmit the list, via communication link 1015, to the second user device 1030. For example, the second user device 1030 may receive a URL, or a notification on a application that upgrades are available and any transactions can be made on said device. In this way, it would be the second user device 1030 that sends the request for an upgrade to the cloud gaming server However, these examples are considered to be non-limited and other combinations of the features herein being spread over two or more devices are considered within the scope of this invention. For example, each of the network module and the control module may be separate internet of things (IoT) devices.

Figure 11:
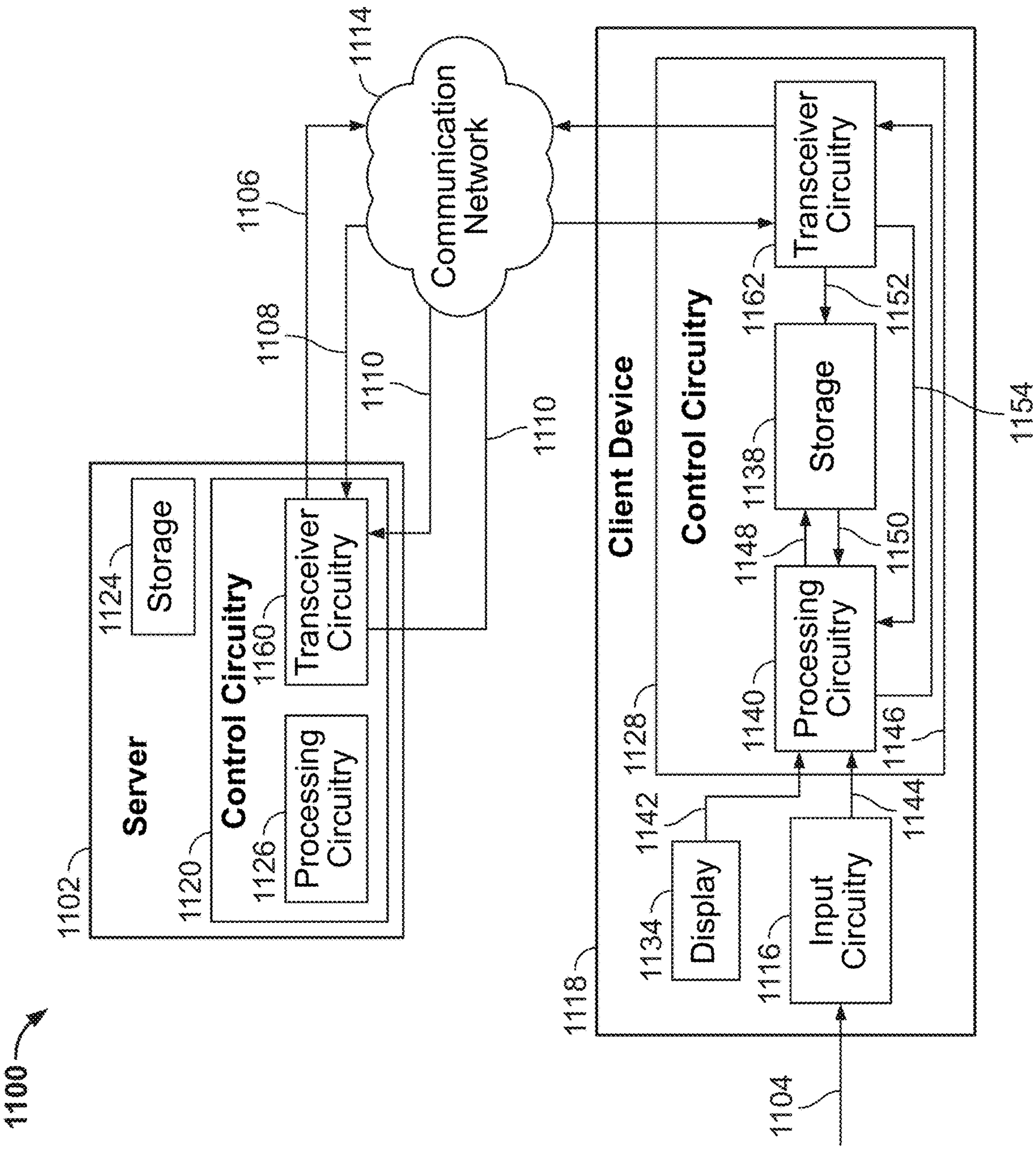
FIG. 11 is a block diagram representing devices, components of each device, and data flow therebetween for a cloud gaming system, in accordance with some embodiments of the disclosure.

FIG. 11 is a block diagram representing devices, components of each device, and data flow therebetween for a cloud computing system, in accordance with some embodiments of the disclosure. System 1100 is shown to include a client device 1118, a server 1102, and a communication network 1114. It is understood that while a single instance of a component may be shown and described relative to FIG. 11, additional instances of the component may be employed. For example, server 1102 may include or may be incorporated in, more than one server. Similarly, communication network 1114 may include or may be incorporated in, more than one communication network. Server 1102 is shown communicatively coupled to client device 1118 through communication network 1114. While not shown in FIG. 11, server 1102 may be directly communicatively coupled to client device 1118, for example, in a system absent or bypassing communication network 1114.

The request to establish a session of gameplay is made by a user device or a network device. For example, a user device or a network device (e.g., a laptop, PC, smartphone, smart TV, or the like) requests cloud gaming server to establish and stream a video game at a recent saved game point. In some examples, the video game content is an adaptive bitrate stream compatible with the standards such as MPEG-DASH or Apple HLS. In some examples, the media content is encoded using an adaptive bitrate streaming compatible codec. There are numerous examples of video codecs that are adaptive bitrate streaming compatible (e.g., x264, OpenH264, H.264/MPEG-4 AVC, which are all codecs compatible with the video format H.264). Moreover, there are numerous examples of video formats (e.g., H.264, H.265, VP9, AV1), each of which has numerous examples of video codecs.

Communication network 1114 may comprise one or more network systems, such as, without limitation, an internet, LAN, WIFI, or other network systems suitable for audio processing applications. In some embodiments, system 1100 excludes server 1102, and functionality that would otherwise be implemented by server 1102 is instead implemented by other components of system 1100, such as one or more components of communication network 1114. In still other embodiments, server 1102 works in conjunction with one or more components of communication network 1114 to implement certain functionality described herein in a distributed or cooperative manner. Similarly, in some embodiments, system 1100 excludes client device 1118, and functionality that would otherwise be implemented by the client device 1118 is instead implemented by other components of system 1100, such as one or more components of communication network 1114 or server 1102 or a combination. In still other embodiments, the client device 1118 works in conjunction with one or more components of communication network 1114 or server 1102 to implement certain functionality described herein in a distributed or cooperative manner.

The client device 1118 includes control circuitry 1128, display 1134, and input-output circuitry 1116. Control circuitry 1128 in turn includes transceiver circuitry 1162, storage 1138, and processing circuitry 1140. In some embodiments, client device 1118 or control circuitry 1128 may be configured as client device 121 of FIG. 1.

Server 1102 includes control circuitry 1120 and storage 1124. Each of the storages 1124 and 1138 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid-state devices, quantum storage devices, gaming consoles, gaming media, or any other suitable fixed or removable storage devices, and/or any combination of the same. Each storage 1124, 1138 may be used to store various types of content, media data, and or other types of data (e.g., they can be used to store multimedia content such as audio, video, and advertisement data). The non-volatile memory may also be used (e.g., to launch a boot-up routine and other instructions). Cloud-based storage may be used to supplement storages 1124, 1138 or instead of storages 1124, 1138. In some embodiments, the pre-encoded or encoded multimedia content, in accordance with the present disclosure, may be stored on one or more of storages 1124, 1138.

In some embodiments, control circuitry 1120 and/or 1128 executes instructions for an application stored on the memory (e.g., storage 1124 and/or storage 1138). Specifically, control circuitry 1120 and/or 1128 may be instructed by the application to perform the functions discussed herein. In some implementations, any action performed by control circuitry 1120 and/or 1128 may be based on instructions received from the application. For example, the application may be implemented as software or a set of executable instructions that may be stored on storage 1124 and/or 1138 and executed by control circuitry 1120 and/or 1128. In some embodiments, the application may be a client/server application where only a client application resides on client device 1118, and a server application resides on server 1102.

The application may be implemented using any suitable architecture. For example, it may be a stand-alone application wholly implemented on client device 1118. In such an approach, instructions for the application are stored locally (e.g., in storage 1138), and data for use by the application is downloaded periodically (e.g., from an out-of-band feed, from an internet resource, or using another suitable approach). Control circuitry 1128 may retrieve instructions for the application from storage 1138 and process the instructions to perform the functionality described herein. Based on the processed instructions, control circuitry 1128 may determine a type of action to perform in response to input received from the input/output path (or input-output circuitry) 1116 or the communication network 1114. For example, in response to a network bandwidth maximum, control circuitry 1128 may perform the steps of processes relative to various embodiments discussed herein.

In client/server-based embodiments, control circuitry 1128 may include communication circuitry suitable for communicating with an application server (e.g., server 1102) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1114). In another example of a client/server-based application, control circuitry 1128 runs a web browser that interprets web pages provided by a remote server (e.g., server 1102). For example, the remote server may store the instructions for the application in a storage device. The remote server may process the stored instructions using circuitry (e.g., control circuitry 1128) and/or generate displays. Client device 1118 may receive the displays generated by the remote server and may display the content of the displays locally via display 1134. This way, the processing of the instructions is performed remotely (e.g., by server 1102) while the resulting displays, such as the display windows described elsewhere herein, are provided locally on the client device 1118. Client device 1118 may receive inputs from the user via input circuitry 1116 and transmit those inputs to the remote server for processing and generating the corresponding displays. Alternatively, client device 1118 may receive inputs from the user via input circuitry 1116 and process and display the received inputs locally, by control circuitry 1128 and display 1134, respectively.

Server 1102 and client device 1118 may transmit and receive content and data such as media content via communication network 1114. For example, server 1102 may be a media content provider, and client device 1118 may be a smart television configured to download or stream media cloud gaming media from server 1102. Control circuitry 1120, 1128 may send and receive commands, requests, and other suitable data through communication network 1114 using transceiver circuitry 1160, 1162, respectively. Control circuitry 1120, 1128 may communicate directly with each other using transceiver circuitry 1160, 1162, respectively, avoiding communication network 1114.

It is understood that client device 1118 is not limited to the embodiments and methods shown and described herein. In non-limiting examples, the client device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1120 and/or 1118 may be based on any suitable processing circuitry such as processing circuitry 1126 and/or 1140, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1120 and/or control circuitry 1118 are configured to implement a media content operation system, such as systems, or parts thereof, that perform various media content manipulation processes described herein.

Client device 1118 receives a user input 1104 at input circuitry 1116. For example, client device 1118 may receive a user input like a user swipe, user touch, or, as previously discussed, user gaming control inputs. In some embodiments, client device 1118 is a media device (or player), with the capability to access media content. It is understood that client device 1118 is not limited to the embodiments and methods shown and described herein. In non-limiting examples, the client device 1118 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1104 may be received from a user selection-capturing interface that is separate from device 1118, such as a game console control device, trackpad, or any other suitable user movement sensitive or capture devices, or as part of device 1118, such as a touchscreen of display 1134. Transmission of user input 1104 to client device 1118 may be accomplished using a wired connection, such as an audio cable, USB cable, ethernet cable, or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 1116 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1140 may receive input 1104 from input circuit 1116. Processing circuitry 1140 may convert or translate the received user input 1104 that may be in the form of gestures or movement to digital signals. In some embodiments, input circuit 1116 performs the translation to digital signals. In some embodiments, processing circuitry 1140 (or processing circuitry 1126, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method for establishing a session of gameplay in a cloud computing system, the method comprising:

receiving, over a network connection, at an edge server of the cloud computing system, a request to establish the session of gameplay on a user device;

retrieving, via the edge server, a user profile associated with a user of the user device, wherein:

the user profile identifies a service level agreement for the session of gameplay; and the service level agreement corresponds to a first combination of compute resource attributes to be provided by the edge server for the session of gameplay;

establishing, via the edge server, the session of gameplay based on the service level agreement identified by the user profile;

evaluating, via the edge server, the service level agreement to determine a first list of available upgrades to the session of gameplay, wherein the first list of available upgrades comprises selectable options to alter the service level agreement to a different combination of compute resource attributes to be provided by the edge server for the session of gameplay;

providing, over the network connection from the edge server, a user interface to the user device, wherein the user interface allows selection from the first list of available upgrades;

receiving, over the network connection, at the edge server, a user selection of at least one available upgrade from the first list of available upgrades;

updating, via the edge server, the service level agreement of the user profile to the different combination of compute resource attributes to be provided by the edge server for the session of gameplay that corresponds to the at least one available upgrade; and reestablishing, via the edge server, the session of gameplay based on the updated service level agreement.

2. The method of claim 1, wherein the evaluation of the service level agreement is carried out in parallel to the session of gameplay.

3. The method of claim 1, wherein the updated service level agreement applies to a second user profile during the reestablishing of the session of gameplay based on the updated service level agreement.

4. The method of claim 1, wherein reestablishing the session of gameplay comprises:

capturing, via the edge server, game state data of the session of gameplay; and storing, at the edge server, the captured game state data, wherein the game state data is used to resume gameplay from a point where the user selected the at least one available upgrade with the updated service level agreement.

5. The method of claim 1, wherein the at least one available upgrade comprises an expiration time; and upon expiration of the expiration time, updating, via the edge server, the service level agreement to remove the at least one available upgrade and return to the first combination of compute resource attributes.

6. The method of claim 1, further comprising:

evaluating, via the edge server, device attributes of the user device; and determining, via the edge server, based on the evaluation of the service level agreement and the device attributes, a second list of available upgrades to the session of gameplay.

7. The method of claim 6, wherein the second list of available upgrades is a subset of the first list of available upgrades.

8. The method of claim 1, further comprising:

retrieving, via the edge server, a list of stored value items corresponding to the at least one available upgrade;

receiving, over the network connection, at the edge server, an authorization generated as a result of a transaction by the user at a point of purchase;

based on the authorization, determining, via the edge server, one or more stored value items of the list of stored value items to apply to the transaction, wherein each stored value item includes an associated value; and transmitting, via the edge server, a transaction indication message to the user.

9. The method of claim 8, wherein a stored value item of the list of stored value items comprises a coupon for use in transactions with a specified merchant, for a specified video game, for a portion of a specified video game, or for a specified time.

10. The method of claim 9, wherein the coupon is obtained after consumption of a media item by the user.

11. The method of claim 8, wherein the transaction by the user at the point of purchase was carried out before the request to establish the session of gameplay.

12. The method of claim 1, wherein establishing the session of gameplay further comprises:

transmitting, over a network via a real-time communication connection from the edge server to the user device, gameplay video and audio generated from the session of gameplay.

13. The method of claim 12, wherein the gameplay video is encoded in a compressed format based on the service level agreement; and wherein the gameplay video is rendered for display by the user device.

14. The method of claim 12, wherein the edge server is configured to receive input data from the user device over a data channel; and wherein the input data is generated at the user device from real-time gameplay using an input mechanism for interactivity with the gameplay video as displayed by the user device.

15. The method of claim 1, wherein the request to establish the session of gameplay comprises a first requested video game, and wherein the first list of available upgrades is determined based on the first requested video game.

16. The method of claim 1, wherein the service level agreement identified by the user profile comprises minimum settings or optimal settings to establish the session of gameplay.

17. The method of claim 1, wherein the available upgrades alter at least one of: a number of compute processing units, a number of graphics processing units, bandwidth, video bitrate, audio bitrate, ray tracing, geometry processing, vector graphics, shaders, texture quality, field of view, depth of field, lens flare, motion blur, anisotropy, gamma correction, color precision, NPC density, or Vsync.

18. The method of claim 1, wherein reestablishing the session of gameplay based on the updated service level agreement occurs at a predetermined scene of the session of gameplay.

19. The method of claim 1, wherein the edge server is a first edge server, the method further comprising:

determining, via the first edge server, that the first edge server is not able to provide the different combination of compute resource attributes of the updated service level agreement; and wherein reestablishing the session of gameplay based on the updated service level agreement further comprises:

reestablishing, via a second edge server, the session of gameplay based on the updated service level agreement, wherein the second edge server is able to provide the different combination of compute resource attributes of the updated service level agreement.

20. A non-transitory computer-readable medium, having instructions recorded thereon for establishing a session of gameplay in a cloud computing system, the instructions comprising:

receiving, over a network connection, at an edge server of the cloud computing system, a request to establish the session of gameplay on a user device;

retrieving, via the edge server, a user profile associated with a user of the user device, wherein:

the user profile identifies a service level agreement for the session of gameplay; and the service level agreement corresponds to a first combination of compute resource attributes to be provided by the edge server for the session of gameplay;

establishing, via the edge server, the session of gameplay based on the service level agreement identified by the user profile;

evaluating, via the edge server, the service level agreement to determine a first list of available upgrades to the session of gameplay, wherein the first list of available upgrades comprises selectable options to alter the service level agreement to a different combination of compute resource attributes to be provided by the edge server for the session of gameplay;

providing, over the network connection from the edge server, a user interface to the user device, wherein the user interface allows selection from the first list of available upgrades;

receiving, over the network connection, at the edge server, a user selection of at least one available upgrade from the first list of available upgrades;

updating, via the edge server, the service level agreement of the user profile to the different combination of compute resource attributes to be provided by the edge server for the session of gameplay that corresponds to the at least one available upgrade; and reestablishing, via the edge server, the session of gameplay based on the updated service level agreement.

* * * * *